United States Patent
O'Connell et al.

(10) Patent No.: US 10,623,692 B2
(45) Date of Patent: Apr. 14, 2020

(54) HIGH DEFINITION ANALOG VIDEO AND CONTROL LINK FOR AUTOMOTIVE APPLICATIONS

(71) Applicant: Analog Devices Global Unlimited Company, Hamilton (BM)

(72) Inventors: Niall D. O'Connell, Clarina (IE); John Cullinane, Kilmallock (IE); Isaac Molina Hernandez, Valencia (ES); Pablo Ventura, Valencia (ES); Alan M. Barry, Muenchen (IE)

(73) Assignee: Analog Devices Global Unlimited Company, Hamilton (BM)

( * ) Notice: Subject to any disclaimer, the term of this patent is extended or adjusted under 35 U.S.C. 154(b) by 0 days.

(21) Appl. No.: 16/174,356

(22) Filed: Oct. 30, 2018

(65) Prior Publication Data

US 2020/0021775 A1    Jan. 16, 2020

Related U.S. Application Data

(60) Provisional application No. 62/697,664, filed on Jul. 13, 2018.

(51) Int. Cl.
| | | |
|---|---|---|
| *H04N 7/10* | (2006.01) | |
| *H04N 7/18* | (2006.01) | |
| *H04N 5/44* | (2011.01) | |
| *H04N 5/38* | (2006.01) | |
| *G05D 1/02* | (2020.01) | |
| *B60R 1/00* | (2006.01) | |

(52) U.S. Cl.
CPC ................. *H04N 7/10* (2013.01); *H04N 5/38* (2013.01); *H04N 5/44* (2013.01); *H04N 7/183* (2013.01); *B60R 1/00* (2013.01); *G05D 1/0231* (2013.01)

(58) Field of Classification Search
CPC ............ H04N 7/10; H04N 7/183; H04N 5/44; H04N 5/38; G05D 1/0231; B60R 1/00
USPC ........................................................ 348/148
See application file for complete search history.

(56) References Cited

U.S. PATENT DOCUMENTS

| | | |
|---|---|---|
| 4,300,161 A | 11/1981 | Haskell |
| 4,335,393 A | 6/1982 | Pearson |
| 4,376,957 A | 3/1983 | Dischert et al. |

(Continued)

OTHER PUBLICATIONS

Non-Final Office Action issued in U.S. Appl. No. 16/172,362, filed Jun. 12, 2019.

(Continued)

*Primary Examiner* — Marnie A Matt
(74) *Attorney, Agent, or Firm* — Patent Capital Group

(57) ABSTRACT

Disclosed herein are systems and methods for communicating video signals and control data over a HD, wired, AC-coupled video and control link. In one aspect, an example system includes a scheduler that is configured to allocate time slots for exchange of data between a transmitter and a receiver over such a link. The scheduler is configured to, for each of at least one or more video lines of a video frame of a video signal acquired by a camera, allocate a plurality of time slots for transmitting a plurality of video components of said video line from the transmitter to the receiver, allocate one or more time slots for transmitting transmitter control data from the transmitter to the receiver, and allocate one or more time slots for transmitting receiver control data from the receiver to the transmitter.

24 Claims, 10 Drawing Sheets

(56) References Cited

U.S. PATENT DOCUMENTS

| | | |
|---|---|---|
| 4,410,981 A | 10/1983 | Flory |
| 4,467,368 A | 8/1984 | Horstmann |
| 4,593,318 A | 6/1986 | Eng et al. |
| 4,633,295 A | 12/1986 | Van De et al. |
| 4,714,959 A | 12/1987 | Pshtissky |
| 5,559,559 A | 9/1996 | Jungo et al. |
| 5,623,304 A | 4/1997 | Ota et al. |
| 5,646,569 A | 7/1997 | Bruhns et al. |
| 5,701,581 A | 12/1997 | Eto et al. |
| 6,345,390 B1 | 2/2002 | Eto et al. |
| 6,711,590 B1 | 3/2004 | Lennon |
| 7,295,578 B1 * | 11/2007 | Lyle .................. G06F 3/14 348/473 |
| 7,684,433 B2 | 3/2010 | Shintani et al. |
| 8,837,006 B2 | 9/2014 | Byrne et al. |
| 9,521,455 B1 | 12/2016 | Gupta et al. |
| 10,251,211 B1 * | 4/2019 | Tan .................. B60N 2/002 |
| 2005/0249178 A1 * | 11/2005 | Bolgiano ............ G01S 5/14 370/342 |
| 2008/0068501 A1 | 3/2008 | Hall |
| 2010/0309382 A1 * | 12/2010 | Matsubayashi ........ G09G 5/006 348/723 |
| 2012/0280796 A1 * | 11/2012 | Gravelle ............ G06K 7/10039 340/10.2 |
| 2013/0249779 A1 | 9/2013 | Harada et al. |
| 2016/0219281 A1 | 7/2016 | Yoshikawa et al. |

OTHER PUBLICATIONS

*To AC-Couple or Not to AC-Couple? That Is the Question!*, Maxim Integrated, Application Note 3768, Mar. 26, 2006, 9 pages.
*SAG Correction*, ON Semiconductor®, Application Note AND8457, Mar. 2010, http://onsemi.com, 7 pages.
William Stutz, *Get a Grip on Clamps, Bias, and AC-Coupled Video Signals*, Electronic Design, Jan. 18, 2004, www.electronicdesign. com/get-grip-clamps-bias-and-ac-coupled-video-signals, 13 pages.
Wikipedia, *HD-MAC*, http://en.wikipedia.org/wiki/HD-MAC, 10 pages.

* cited by examiner

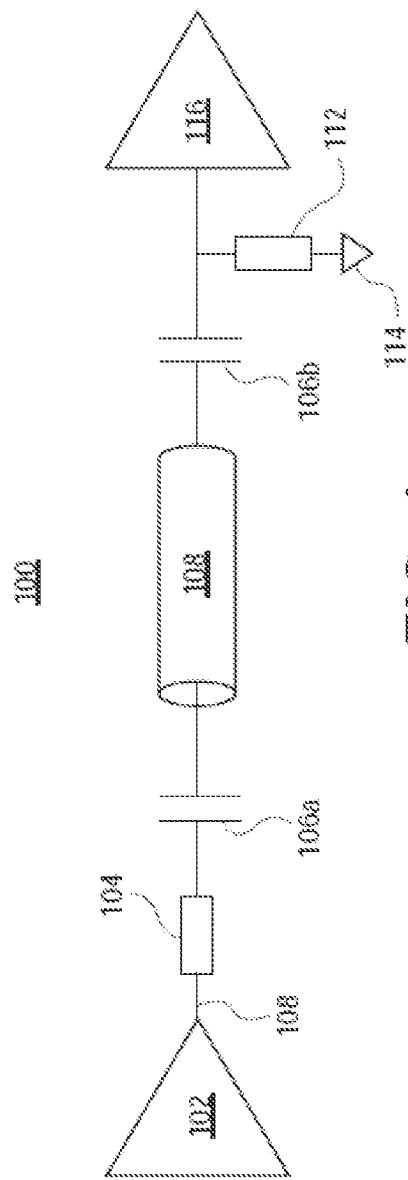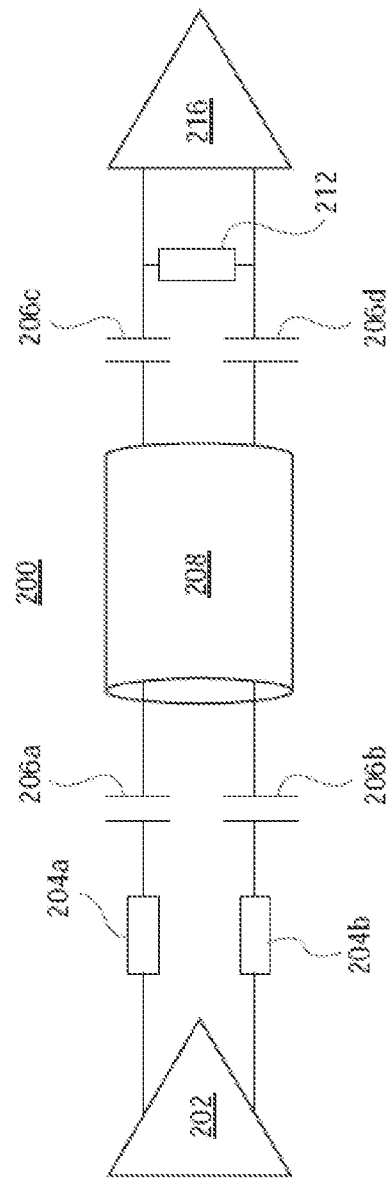

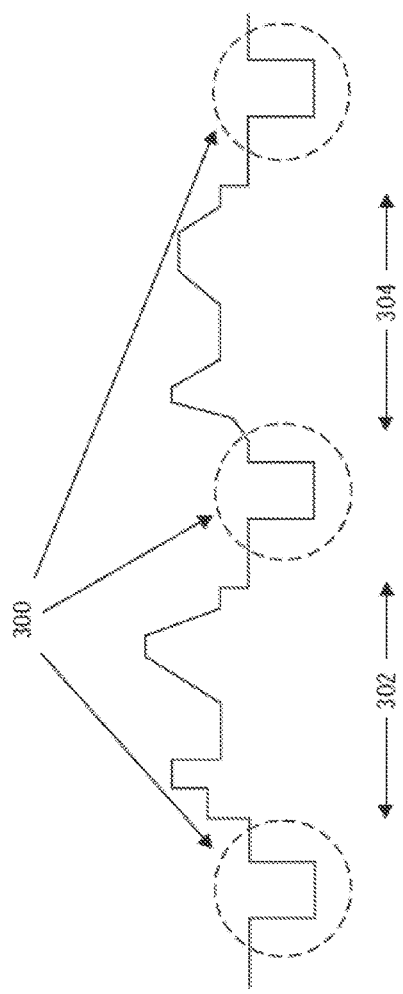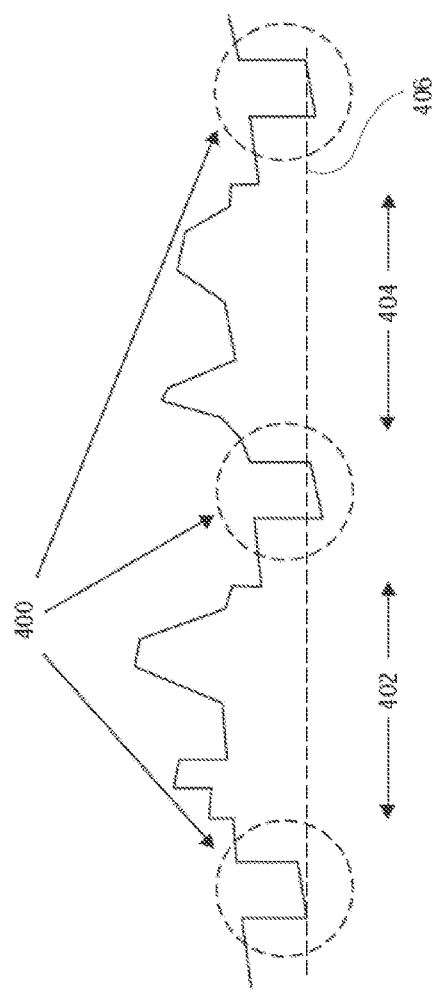

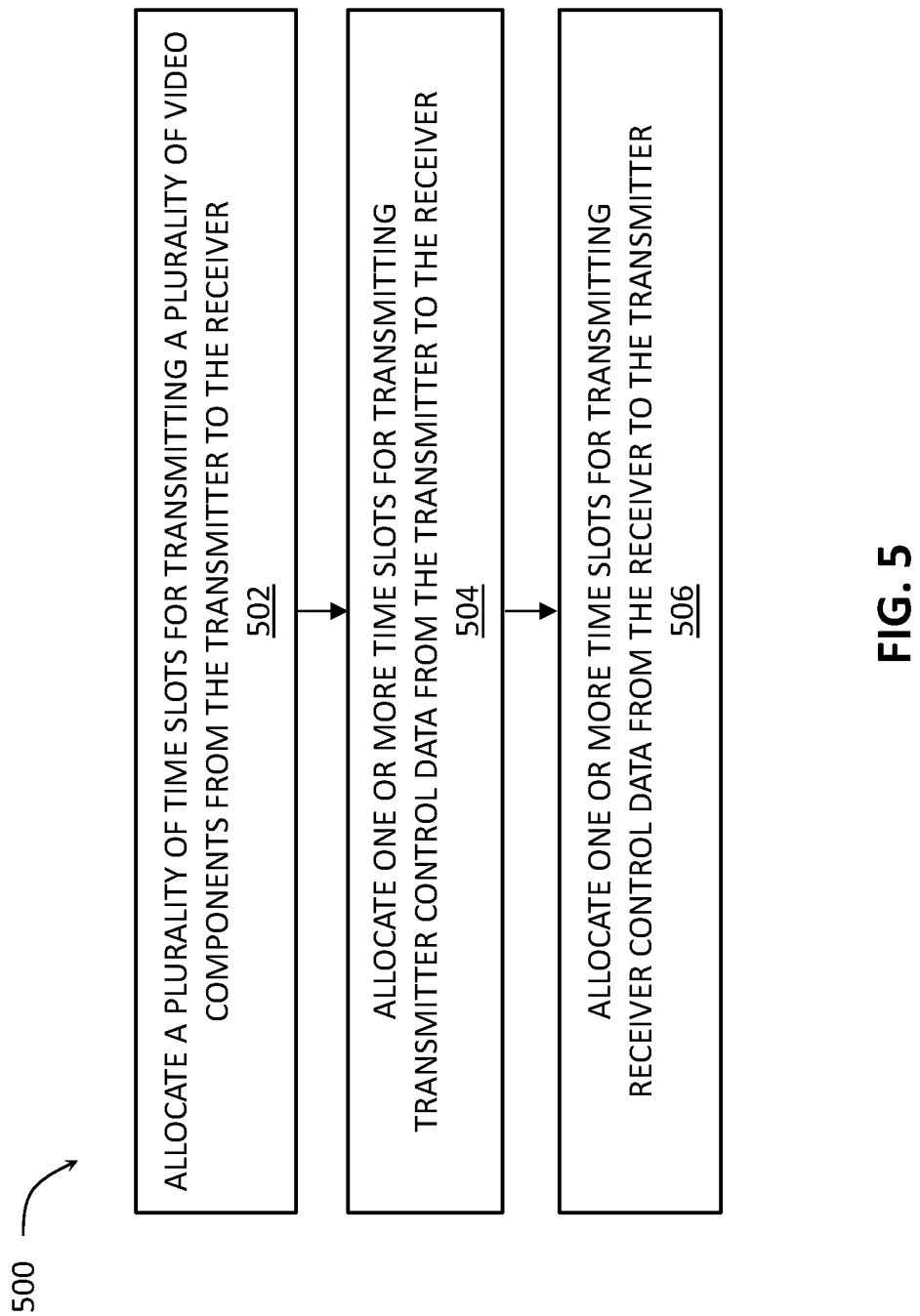

HIGH DEFINITION ANALOG VIDEO AND CONTROL LINK FOR AUTOMOTIVE APPLICATIONS

CROSS-REFERENCE TO RELATED APPLICATIONS

This application claims the benefit of and priority from U.S. Provisional Patent Application Ser. No. 62/697,664 filed 13 Jul. 2018, entitled "VIDEO TRANSMISSION OVER AC-COUPLED CHANNELS", incorporated herein by reference in its entirety.

TECHNICAL FIELD OF THE DISCLOSURE

The present disclosure relates to the field of video signal transmission, and in particular to analog video signal transmission over alternating current (AC)-coupled channels.

BACKGROUND

Video-based applications which rely on real-time video information acquisition, such as automotive infotainment, automotive driver assistance systems (ADAS), self-driving vehicles and security surveillance systems, generally involve the capture and generation of video data by one or more cameras. Such cameras may include, for example, charge-coupled devices (CCDs), complementary metal-oxide-semiconductor (CMOS) image sensors, or any other suitable video capturing devices which, broadly speaking, translate photons incident thereon into digital (raw or pixel) video data. In such applications, the video data will usually have to be transmitted in real-time from the camera to other devices for processing. Such devices may include, for example, electronic control units (ECUs) or components in communications or alerting systems. Such devices may, for example, execute specialized software to perform processing and analytical tasks based on the acquired image and/or video data and provide outputs accordingly. The combination of layers of transmission infrastructure enabling the transfer of the data between the camera and the video data receiving device/processor may be referred to as a "video link" or a "camera link."

A variety of factors can affect the cost, quality and robustness of a video link. Physical constraints such as space/surface area and also regulations can pose further constraints to the video link requirements or specifications, and thus trade-off and ingenuity will have to be exercised.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1 shows a schematic example of an AC-coupled circuit in a single-ended transmission scheme in accordance with some embodiments of the present disclosure;

FIG. 2 shows a schematic example of an AC-coupled circuit in a differential transmission scheme in accordance with some embodiments of the present disclosure;

FIG. 3 is a schematic depiction of a video signal during an ideal transmission in which the signal is not subject to the signal amplitude gain (SAG) effect;

FIG. 4 is a schematic depiction of a video signal exhibiting the SAG effect during transmission over an AC-coupled system;

FIG. 5 is a flowchart of a method of allocating time slots within a video line for exchange of video signal and control data between the transmitter and the receiver in accordance with some embodiments of the present disclosure;

DESCRIPTION OF EXAMPLE EMBODIMENTS OF THE DISCLOSURE

Overview

Figure 6:
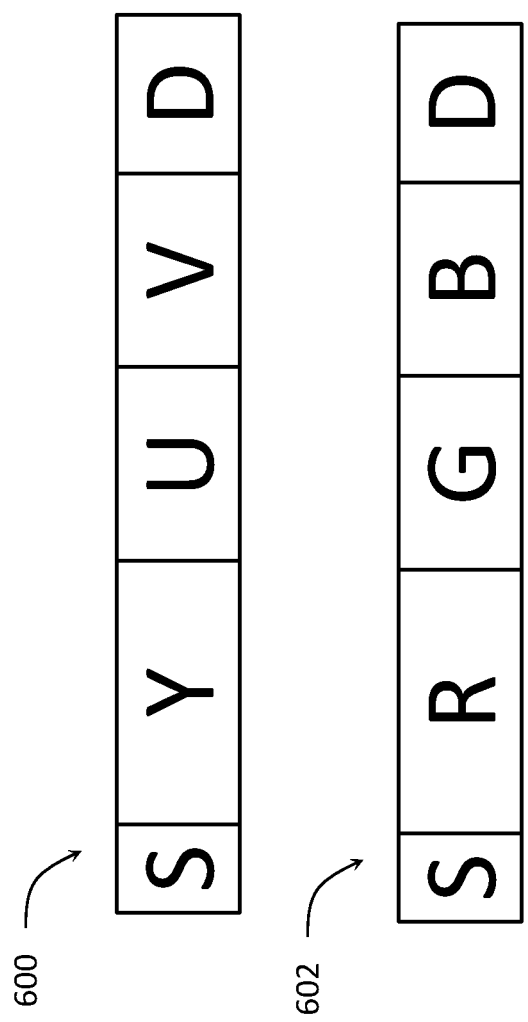
FIG. 6 is a schematic illustration of example sequences of time slots for YUV and RGB color spaces in accordance with some embodiments of the present disclosure.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Disclosed herein are systems and methods for communicating video signals and control data over a wired, AC-coupled video and control link. Such systems and methods may be particularly suitable for, but are not limited to, being used in a vehicle (where the term "vehicle" includes not only wheeled vehicle such as a car, a truck, or a bus, but also includes an airplane, an aircraft, or a spacecraft, for example), in a surveillance system, or in any other environment where a transmitter, placed at one location within such an environment (e.g., within a vehicle) and configured to receive a video signal acquired by a camera that is communicatively coupled to the transmitter, and a receiver, placed at another location within such an environment may need to communicate video signals and other data with one another over a wired link. Furthermore, while this disclosure mainly describes video links and video signals, embodiments of the present disclosure are applicable to types of signals other than video signals, such as audio, image, or any combination thereof, which may be transmitted over an AC-coupled analog transmission channel, as disclosed herein.

In one aspect of the present disclosure an example system for communicating video signals and control data over a wired analog transmission link is provided. The system includes a scheduler that is configured to allocate time slots for exchange of data between a transmitter and a receiver over the wired analog transmission link. In particular, the scheduler is configured to, for each of at least one or more video lines (e.g., for a plurality of video lines, e.g., for each video line) of a video frame of a video signal acquired by an image sensor in a camera, allocate a plurality of time slots for transmitting from the transmitter to the receiver, over the wired analog transmission link, a plurality of video components of said video line, allocate one or more time slots for transmitting from the transmitter to the receiver, over the same wired analog transmission link, transmitter control data (i.e., data sent by the transmitter, also referred to herein as "downstream" data, which data is data other than video components indicative of the active pixel values as acquired by the camera), and allocate one or more time slots for transmitting from the receiver to the transmitter, over the same wired analog transmission link, receiver control data (i.e., data sent by the receiver, also referred to herein as "upstream" data). Such an implementation advantageously allows transmitting all of the different video components over a single wired transmission link, without interference or crosstalk between those components. Furthermore, such an implementation advantageously enables provision of not only downstream data, but also upstream data, which allows, e.g., the receiver or a further device communicatively coupled to the receiver to (re-)configure the transmitter or a further device communicatively coupled to the transmitter, e.g. to (re-)configure the camera. Still further, scheduling the time slots as described herein advantageously allows transmitting the video signal and upstream and downstream control data over a single wired link, which link may, therefore, be referred to as a "video and control" link. In various aspects of the present disclosure, such a link may be a high definition (HD) link.

Other aspects of the present disclosure provide methods for operating such a system, as well as computer-readable storage media storing instructions which, when executed by a hardware processor, cause the processor to carry out the methods of implementing time slots to exchange video signals as well as downstream and upstream control data between a transmitter and a receiver over an AC-coupled video and control link.

As will be appreciated by one skilled in the art, aspects of the present disclosure, in particular aspects of an HD, AC-coupled video and control link as proposed herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing analog transmission systems, in particular—analog video transmission systems that use AC-coupling, including transmitters, receivers, and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Other features and advantages of the disclosure will be apparent from the following description and the claims.

Analog Vs Digital Video Transmission

In systems requiring the transfer of video data between system elements (e.g., between an image sensor and a processor implemented at a certain distance from the image sensor), such as surround view ADAS or (security) surveillance systems, the video data acquired by a camera can be transmitted in digital form, e.g., as a serialized digital bit stream, which can be, e.g., as RAW data as acquired by the image sensor or in some processed form, e.g., YUV data produced by an image system processor (ISP) performing de-mosaicking on the RAW image sensor data. Alternatively, the video data acquired by a camera may be converted and formatted into an analog signal prior to transmission, and then transmitted in analog form.

Analog video signal transmission can be advantageous when contrasted to digital transmission. The serialized nature of digital transmission results in digital transmission requiring higher bandwidth than analog transmission. To satisfy the higher bandwidth requirement, more expensive infrastructure is required. Also, while bit accuracy is maintained in digital transmission and may be compromised in analog transmission, the impact of errors that do occur in a digital transmission can be much more impactful than those that occur in analog transmission in terms of the output video quality. Thus, transmitting the original digital video data as an analog signal offers several advantages over digital signal transmission. A system based around analog transmission may offer reduced cost and a more robust transmission. Thus, while the image sensor will generally output digital video data, this may be converted into an analog signal for transmission over an analog video link to a receiver for further processing.

AC-Coupled Vs DC-Coupled Analog Transmission

In implementing analog signal transmission over a wired transmission line, a choice can be made between AC- and DC-coupling (the latter also referred to as "conductive coupling").

AC-coupling requires the use of at least one coupling capacitor, which is an additional component compared to DC-coupling where such capacitors are not required. An AC-coupled wired transmission line between a transmitter and receiver typically includes a first coupling capacitor, placed after the transmitter and prior to the transmission channel, and a second coupling capacitor, placed after the transmission channel and prior to the receiver. The term "coupling capacitor" as used herein may refer to one or more coupling capacitors. By contrast, in DC-coupling, only resistors or simply wire(s), and no coupling capacitors, are used and, therefore, DC-coupling is generally favored due to its simpler implementation and lower cost and space requirements.

Furthermore, the coupling capacitor(s), together with the termination resistors at either end and with the impedance of the wired transmission cable, may act as a high-pass filter and, thus, may attenuate the transmission of lower frequency components of the analog signal. This is relevant to the transmission of video signals, as the frequency spectrum of such signals often includes DC level and low-frequency elements which would be vulnerable to such high-pass filtering, resulting in loss or distortion of picture information. Thus, it is desirable that a video signal can be preserved down to very low frequency and down to the DC level components. This means that coupling capacitor(s) used for AC-coupling may need to be very large in order to minimize the cutoff frequency of the high-pass filter formed with the receiver termination. Some implementations of AC-coupling may require capacitances as large as about 220 microfarad (uF) to preserve those lower frequency components. Therefore, AC-coupling may be regarded as an undesirable option due to prohibitively large capacitor size requirements.

However, AC-coupling can be advantageous in certain applications as it provides improved tolerance against some fault conditions. This is the case, for example, in automotive/vehicle applications, in which reducing the risk of damage during a short-to-battery (STB) fault condition may be a motivation for AC-coupled video links because, as they block DC voltage levels, AC-coupled links are intrinsically resistant to STB faults. On the other hand, DC-coupling of the transmitter output buffer to the transmission medium can be challenging due to the requirement to be robust to STB fault conditions, which may require the transmitter devices to be designed and manufactured on a high-voltage semiconductor process technology, which is typically more expensive than standard (low-voltage) semiconductor processes technology. Thus, transmitting video signals in an AC-coupled analog signal format can be a cost-effective and robust transmission option, particularly in automotive applications.

Single-Ended Vs Differential-Pair AC-Coupled Analog Transmission

An AC-coupled transmission line for transfer of video data can be implemented according to either a single-ended or a differential-pair transmission scheme. In some implementations, differential-pair video transmission may be particularly advantageous as it may benefit from a stronger immunity to noise compared to single-ended video transmission.

In a single-ended implementation of an AC-coupled transmission line, a respective coupling capacitor may be placed in each of the two sides of a single-ended transmission line, i.e., one coupling capacitor between a transmitter and a conductor cable of the line, and another coupling capacitor between that conductor cable and a receiver. In a differential implementation of an AC-coupled transmission line, a respective pair of coupling capacitors may be placed in each of the two sides of a differential-pair transmission line, i.e., a pair of coupling capacitors between a transmitter and a conductor cable of the line, and another pair of coupling capacitors between that conductor cable and a receiver. In various embodiments, a conductor cable (or simply "cable") may be implemented in any suitable cabling scheme, e.g., as a single conductor (i.e., a conductor wire), as a coaxial cable, or as a dual conductor such as unshielded twisted pair (UTP) or STP (shielded twisted pair), depending on the transmission scheme used (i.e., depending on whether the transmission scheme is single-ended or differential). In some embodiments, the cable of a video transmission channel may include an RCA-type cable or a coaxial cable (which includes a signal wire at least partially enclosed within a shield of conductive material), or an unshielded AVSS, CIVUS or similar signal wire, within a shielded bundle.

FIGS. 1 and 2 show schematic examples of a single-ended and a differential-pair transmission channels, respectively.

In an AC-coupled transmission scheme 100 shown in FIG. 1, a signal, which may comprise an analog-formatted video signal, is transmitted over a single conductor cable 108, which may be seen as a transmission channel 108. In some embodiments, the conductor cable 108 may include a simple conducting wire. In some embodiments, the conductor cable 108 may include a coaxial cable that includes a core conductive wire and a conductive shield, with the core wire carrying the video signal and the shield being grounded. Since the transmission scheme 100 is a single-ended signaling transmission scheme, only a first wire carries a varying voltage between the transmitter and receiver, while a second wire conductor (not shown in FIG. 1) may be connected to and carry a reference voltage signal (such as that provided by a ground reference 114 shown in FIG. 1). As shown in FIG. 1, the conductor cable 108 connects a transmitter 102 and a receiver 116. In this scheme, one or more coupling capacitors 106a, 106b may be connected between the transmitter 102 and receiver 116. In particular, one or more coupling capacitors 106a may be connected between the transmitter 102 and the conductor cable 108, and one or more coupling capacitors 106b may be connected between the conductor cable 108 and the receiver 116. The transmitter 102 may exhibit a total resistance 104 while the receiver 116 may exhibit a total resistance 112, which are in serial connection with the transmitter 102.

Alternatively, in an AC-coupled transmission scheme 200 shown in FIG. 2, a signal, which may comprise an analog-formatted video signal, is transmitted over a differential-pair conductor cable 208, which may be seen as a transmission channel 208. In some embodiments, the conductor cable 208 may include a UTP or an STP cable. While single-ended implementation can be advantageous due to its simpler implementation and lower cost, differential-pair signaling transmission schemes may advantageously offer resistance to external electromagnetic interference (EMI) and reduce the amount of electromagnetic emissions produced by the link. This is because the properties of the two separate signals/lines of the differential-pair of lines can be selected so as to provide cancellation of common mode interfering signals. As shown in FIG. 2, a transmitter 202, which may exhibit resistances 204a and 204b (serially connected to the transmitter 202) in the two lines of the differential-pair scheme, is connected to the conductor cable 208 via a pair of coupling capacitors 206a, 206b. Similarly, a receiver 216 is coupled to the conductor cable 208 via a resistance 212 (in parallel connection with the receiver 216) and a pair of coupling capacitors 206c, 206d.

Undesirable Effects of AC-Coupling

As shown in FIGS. 1 and 2, both the transmitter and receiver may be AC-coupled to the conductor cable or wire (the terms wire and cable may be used interchangeably herein). While AC-coupling (whether in a single-ended or a differential-pair implementation) may provide significant robustness, risk and cost benefits, particularly on the transmitter side, it may also present significant challenges in transmission of analog video data.

As briefly described above, one source of the challenges is due to the presence of coupling capacitors used for AC-coupling, because such capacitors form high-pass filters with the termination resistors at either end of the conductor cable. For example, in a 50 Ohm system with 1 uF coupling capacitors, the cutoff frequency of the high-pass response may be about 3 kilohertz (kHz), which means that signal components with frequencies below 3 kHz cannot be transmitted through the coupling capacitors. Increasing the size of the coupling capacitors may somewhat decrease the cutoff frequency, but that is not always possible or feasible due to, e.g., cost and space considerations (e.g., the maximum size of the coupling capacitors may be limited by the available board space).

Not being able to pass signal components below a certain frequency is particularly problematic for video signals, the spectral content of which often includes low frequency and DC level components, which may stem from the manner in which video data is typically formatted. Although well-known in the art, a brief explanation of example formatting of video data is provided below.

In a typical camera, color is produced by filtering the light hitting each photosite (or pixel) to produce either red, green or blue values. The arrangement for the different colors (i.e., color pattern) of the photosites most often used is a so-called "Bayer pattern." RAW data of a single image acquired by a camera (where a video is a sequence of images) like this represents the value of each pixel, for pixels of different colors. In other words, for a single image, RAW data may include pixel values for all red pixels (i.e., pixels configured to filter the incoming light to detect wavelengths in the spectrum associated with red color), pixel values for all green pixels (i.e., pixels configured to filter the incoming light to detect wavelengths in the spectrum associated with green color), and pixel values for all blue pixels (i.e., pixels configured to filter the incoming light to detect wavelengths in the spectrum associated with blue color). Each pixel may be characterized by, inter alia, an intensity or magnitude, and is represented by a number of bits (e.g., 10 bits) used to represent a magnitude of a signal acquired/stored in a particular pixel for a particular component.

RAW data may be processed to form components which are then transmitted in a video signal. For example, red, green, and blue values, or some processed version of those values, are one example of different components of an acquired image, together referred to as "RGB" color space. RAW data may interpolated, a process known as de-mosaicking, and then be transformed to other types of color spaces by an ISP, e.g., in "YUV" color spaces, where Y is a luminance component, carrying the intensity of light information, and U and V are chrominance components, carrying the color information. A video frame may be composed of a matrix of individual pixels of one or more components. In some embodiments, different components may be transmitted by different channels. Unless specified otherwise, descriptions provided herein may refer to pixel values of a certain component or a combination of components.

The pixel values of a video frame (the pixel values or pixels sometimes referred to as "active pixels" to indicate that they contain values representing a video frame as acquired by a camera) may be grouped into horizontal lines, and these horizontal lines may be grouped, or stacked, vertically to form a video frame. The screen is built up scanline by scanline, by sending the pixel values, represented by appropriate component values (e.g., RGB or YUV values), over the video link. However, only having a stream of components, e.g., a stream of RGB colors, is not sufficient to know which part of the stream belongs to a particular pixel (e.g., the top-left pixel) on a display. To solve this, two more signals are added to the video signal containing the values of active pixels to be transmitted—one is a signal containing horizontal synchronization ("horizontal sync") pulses and another one is a signal containing vertical synchronization ("horizontal sync") pulses. A horizontal sync pulse provides a reference for different video lines (i.e., it provides an indication of a start-of-line point), while a vertical sync pulse provides a reference for different video frames (i.e., it provides an indication of a start-of-frame point). A horizontal sync pulse (or, simply, "horizontal sync") may be a pulse inserted into a video signal before a stream with pixel values for a given horizontal line begins or/and when a horizontal line is done (but is typically inserted before a horizontal line begins). In between two consecutive horizontal sync pulses active pixel data for the line (i.e., pixel values representative of the line of the video frame) is included. A vertical sync pulse (or, simply, "vertical sync," also sometimes referred to as a "vertical retrace") may be a pulse or sequence of pulses inserted into a video signal when all horizontal lines of a given video frame have been completed or/and when before horizontal lines of a new video frame begin. Thus, each frame boundary may be demarcated by a single vertical sync pulse or sequence of pulses. Since each line of a frame has the same number of pixels, the time between consecutive horizontal sync pulses is a constant. Since each full frame (i.e., a frame with all of its lines) has the same number of pixels, the time between consecutive vertical sync pulses is a constant. In this manner, horizontal and vertical sync pulses allow determination of which color component of the video signal belongs to which position to be displayed on the screen. All common analog video transmission schemes mimic this organization of the pixels in a frame and mark the start-of-line and start-of-frame times with a horizontal sync and vertical sync pulses, respectively.

FIG. 3 illustrates a simplified example of an analog (video) signal showing how horizontal sync pulses 300 may be included into the video signal to be transmitted. As shown in FIG. 3, between each two consecutive horizontal sync pulses 300, active pixel data may be included, labeled in FIG. 3 as video lines 302 and 304 (i.e., lines which carry the video data). The pulses 300 are referred to as horizontal sync pulses due to the fact that they indicate the starting point for the active pixel values that would be rendered as a horizontal pixel line. Vertical synchronization lines (not shown in this example) indicate the beginning of a new video frame (within which the plurality of subsequent horizontal pixel (data) lines will share a common vertical start point). Typically, but not necessarily, the horizontal sync pulses occupy the lowest portion of the signal range. A flat portion immediately before the horizontal sync pulse is referred to as a "front porch" and a horizontal portion immediately after the horizontal sync pulse is referred to as a "back porch", which portions are set to certain predefined signal levels (e.g., both may be set to a zero voltage level) and may then be used to identify the horizontal sync pulses.

The example of FIG. 3 shows an ideal transmission scenario in which the horizontal sync pulses maintain their original level. However, when these (electrical) pulses are transmitted over an AC-coupled channel, their flatness or level may deteriorate (i.e., their constant magnitude throughout a specified duration will not be maintained and will deteriorate) because the coupling capacitor(s) will delay passage of the electrical charge, thereby causing what graphically appears like a drooping or sagging of the otherwise horizontal pulse (i.e., straight lines become curved). Such an undesirable effect caused by using the coupling capacitors is commonly referred to as a signal amplitude gain (SAG) effect (or simply "SAG" or "sagging"). The SAG effect can be characterized as a gradual increase or decrease in the level of the video signal across its horizontal (i.e., DC level) components in a way that is dependent on its amplitude. When a horizontal pulse is a low value, the SAG will result in the magnitude of the pulse gradually increasing. When a horizontal pulse is a high value, the SAG will result in the magnitude of the pulse gradually decreasing. While the first value of a horizontal pulse may remain unaffected, subsequent points gradually increase when the pulse is low or gradually decrease when the pulse is high. This effect is shown in FIG. 4, where the level of the horizontal sync pulses 400 are shown to droop or sag (hence, the terms "sagging" and "SAG effect") with respect to a reference line 406 which indicates the intended flat level. As can be seen in FIG. 4, the same behavior may be exhibited by the values of the active pixels.

The SAG effect originates from the fact that the coupling capacitor(s) used for AC-coupling, in combination with the termination resistance, effectively act as high-pass filters, letting high frequency components through while altering the amplitude of lower frequency components. The magnitude of the effect depends on the total series capacitance of the one or more coupling capacitors, as well as the value of the termination impedance employed. This will naturally affect the quality of the transmitted low frequency signals, and is particularly detrimental to video signals, which are formatted to have a DC component, and may significantly impact the quality and fidelity of the rendered/displayed output.

The SAG effect can also significantly affect the timing data included in the video signal, in particular, it can shift DC levels of e.g. the front porch and the back porch of the horizontal sync signals used for extracting timing information that indicates beginning and end of different horizontal video lines. Therefore, typically, DC offset correction is performed on the received video signal in an attempt to restore the DC content that was compromised. A conventional DC offset correction includes a clamping scheme in which the DC level of the received video signal is accumulated, or averaged, over a number of consecutive digital samples (e.g., 8, 16, or 32 samples) of the sync pulse (i.e., the sync tip), front porch, or back porch regions of a video line, and then this computed average is compared with a certain predefined target value. The difference between the computed average and the predefined target is then used as a clamp offset signal and the next video line is adjusted by this clamp offset amount, thus realizing DC offset correction. One drawback of such conventional implementation of DC offset correction for AC-coupled video signals is that any error in the measurements on the receiver side can result in a significant line-to-line uncorrected offset in the clamp offset value. Also, the bit depth, and therefore the precision, of the clamp adjustment is typically limited. As a result, conventional DC offset correction schemes still can result in visible patterns undesirably appearing in the final output video, where the brightness of the resulting image varies slightly but noticeably from line to line. This is particularly noticeable on regions of the picture with uniform color, when viewed in low ambient light, which is often the viewing environment for a display within a vehicle.

Limitations of Existing Analog Video Transmission Schemes

Besides the significant challenges related to the SAG effect, described above, known video transmission links have several other limitations.

Known analog video transmission links, due to their choice of transmission format, are often limited in the type of video signals they can carry and, for example, are not capable of encoding/transmitting full RAW-type video data from an image sensor.

In addition, known schemes still retain some transmission quality limitations and induce artefacts in the transmitted data as with regular definition National Television System Committee (NTSC) analog television systems. For example, in NTSC, and known analog video transmission links based thereon, the color signals are modulated onto a carrier signal, which results in spectral overlap with and interference/crosstalk with each other and/or with the luminance signal, which limits the resolution and quality of the received color signals.

High quality video data reproduction is a critical factor in applications such as ADAS, where accurate image recognition and analysis are necessary to ensure that the system takes the correct actions and/or makes the right decisions. Data being corrupted during transmission and/or if image quality being degraded due to limitations in the transmission scheme can result in poor image recognition, which could lead to missed events and/or false alerts.

Moreover, while digital transmission schemes are not susceptible to the SAG effect, nor the crosstalk issues mentioned above, their implementation in certain deployment scenarios, e.g., in vehicles and surveillance systems, is often prohibitively expensive, due to the requirement for high bandwidth, high quality cable and connector infrastructure.

Video and Control Link

Embodiments of the present disclosure aim to provide an improvement on at least some of the limitations described above. To that end, several methods and devices are provided for the transmission of an HD video signal (which includes, in general, video/audio/image signal), in AC-coupled analog form, over a single wire (in a single-ended configuration, as described above) or, alternatively, over a differential-pair of wires (in a differential-pair configuration, as described above) and for the reception of said video signal, where the component parts of the video signal may be encoded and transmitted within respective time slots of any of a plurality of transmission sequences disclosed herein. Various aspects of the present disclosure enable reliable and high quality transmission of video data. Further, various aspects of the present disclosure enable advantageous system architecture options, for example enabling the ISP to be located remotely from the space-and-power-constrained camera, while keeping the overall system cost lower than known digital alternatives. It is noted that the terms video transmission format, video line format, and transmission sequence may be used interchangeably herein.

Systems, methods, devices, and non-transitory computer-readable media for encoding, transmitting, decoding and receiving one or more signals are described herein. The various embodiments of the present disclosure may be implemented or deployed alone or in combination. While exemplary embodiments are explained herein in relation to video information signals, various embodiments of the present disclosure may be applied to a diverse range of types of information signals, such as, but not limited to, video and audio information combination signals and combined media (e.g. video, audio, etc.) and control data signals, without departing from the scope of the present disclosure. Embodiments of the present disclosure may be implemented or deployed in a wide range of systems, applications, and/or environments, such as, but not limited to, automotive infotainment, ADAS, self-driving vehicles, security surveillance systems, and CCTV systems.

Scheduling Time Slots for Transmission of Signal and Control Data

Embodiments of the present disclosure are based on scheduling time slots for transmission of video signals, downstream control data, and upstream control data over a single HD, AC-coupled video and control link. FIG. 5 presents a flowchart of an example method 500 of allocating time slots for exchange of video signal and control data between the transmitter and the receiver in accordance with some embodiments of the present disclosure. The method 500 can be implemented using any video system in which a video signal is acquired by a camera or generated in any other manner on the transmitting side and is transmitted, by a transmitter, to a receiver, over an AC-coupled wired video link, to be processed, and possibly displayed on a display, on the receiving side. The method 500, in whole or in part, can be implemented using, for example, a video system 900 shown in FIG. 9, and/or a data processing system 1000 shown in FIG. 10, described below. However, in general, the method 500 can be implemented using any system other than a video system, in which a video/audio/image signal acquired by a suitable sensor, or generated in any other manner, on the transmitting side is transmitted, by a transmitter, to a receiver, over an AC-coupled wired link, to be processed and possibly reproduced on the receiving side.

Prior to the beginning of the method 500, a video signal to be transmitted from a transmitter to a receiver over the AC-coupled video and control link is generated. In some embodiments, the video signal may be generated by an image sensor, e.g., within a camera. In other embodiments, the video signal may be a computer-generated video signal, or a video signal provided from some other system. In some embodiments, a video signal to be transmitted from the receiver to the transmitter may be generated by a video generator 912, shown in FIG. 9, which may be included in the transmitter, or may be external to the transmitter but be communicatively coupled to the transmitter.

Various operations of the method 500 may be performed by a scheduler, which may be implemented as a logic element controlling functionality of the transmitter and the receiver. For example, in various embodiments, the scheduler may be implemented in the transmitter logic 916, in the receiver logic 926, distributed between these two logic elements, or be implemented in a separate logic element analogous to the transmitter or receiver logic as described below with reference to FIGS. 9 and 10.

Various operations of the method 500 may be performed by the scheduler for each of at least one or more video lines of a video frame of the video signal. In some embodiments, these operations may be performed for each video line of each video frame of the video signal. In other embodiments, these operations may be performed for a plurality, but not all, video lines of some (possibly all) video frames of the video signal. Thus, typically, operations of the method 500 may be repeated several times for transmitting different portions (e.g., different video lines) of a video signal. In general, the operations of the method 500 may be performed on, as needed basis, when control data is to be communicated between the transmitter and the receiver. Although various operations of the method 500 are shown in FIG. 5 in a certain order, in other embodiments, the order of these operations may be different than what is shown in FIG. 5, and/or some operations may be repeated.

Figure 9:
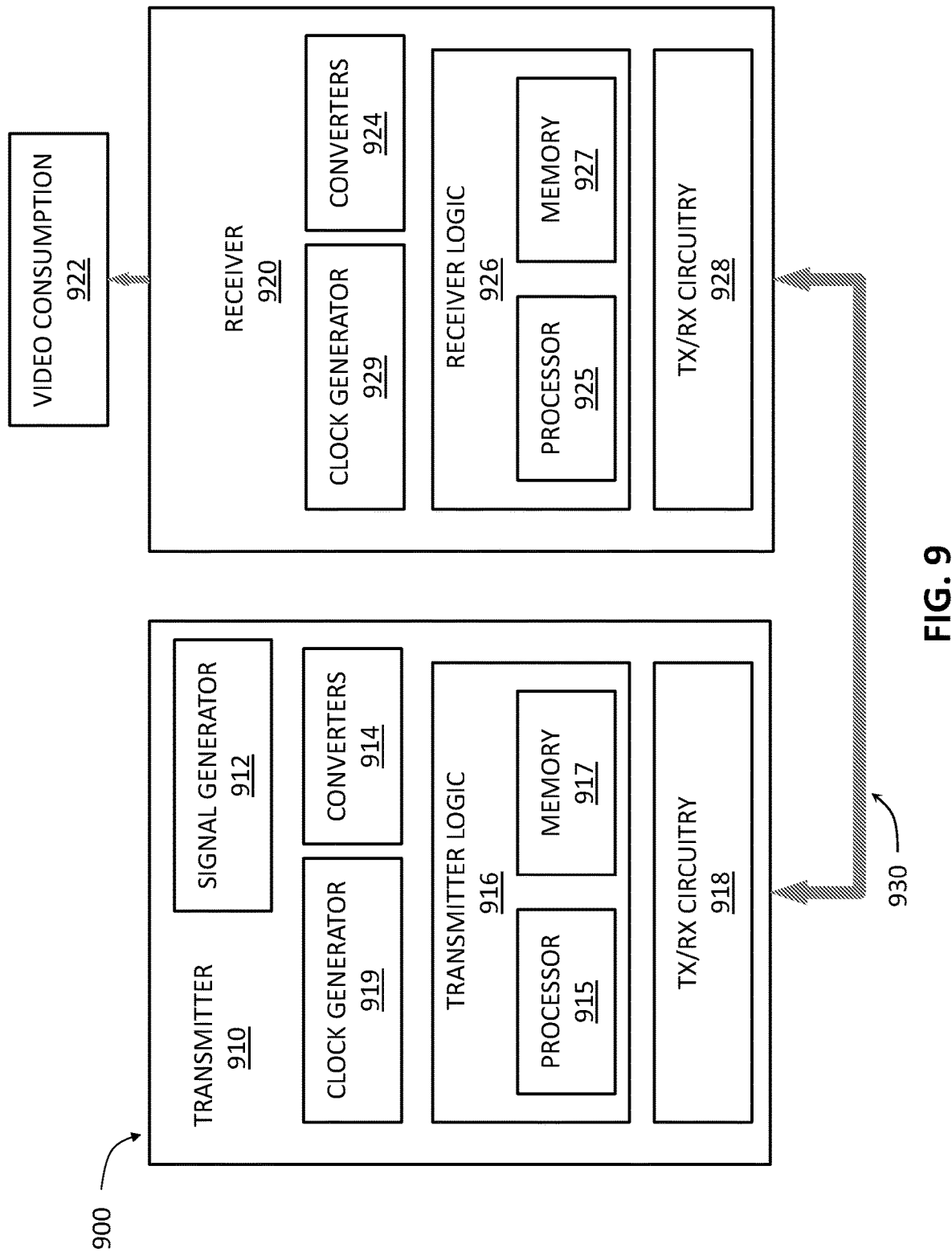
FIG. 9 provides a block diagram illustrating an example video system in accordance with some embodiments of the present disclosure.

As shown in FIG. 5, the method 500 may include a block 502, in which a scheduler is configured to allocate a plurality of time slots for transmitting, from the transmitter to the receiver, over an AC-coupled transmission link, e.g., the link 930 shown in FIG. 9, a plurality of video components of an individual video line of the video frame of the video signal acquired by the camera. Thus, scheduling of time slots in 502 allows multiplexing different video components so that they can be transmitted over a single wired link, as opposed to a plurality of individual links, as has been done in some conventional implementations where each video component was transmitted over an individual wire. In some embodiments, unlike known analog video transmission links, none of the plurality of the video components transmitted from the transmitter to the receiver are modulated on a carrier signal for transmission from the transmitter to the receiver, which advantageously prevents interference/crosstalk between those components and allows each video component for each pixel to be individually recovered in the receiver. Video components not being modulated on a carrier signal but being time-multiplexed, means that different components can occupy substantially the same frequency band, or, in other words, are not separated in frequency but, due to time-multiplexing, do not interfere with each other.

In some embodiments, the plurality of components for which the scheduler schedules time slots in 502 may include a set of components that includes at least a first color component and a second color component. For example, RAW transmission from an image sensor may send a G component and an R components on odd-numbered lines and a G component and a B component on even numbered lines, or vice versa—G, B on even and G, R on odd lines, and the components would then be similarly arranged for analog transmission from the transmitter to the receiver. Thus, even though there may be 3 color components used in total, these color components may be scheduled for transmission with only two at a time. In other embodiments, a set of components for which the scheduler schedules time slots in 502 may include all three color components. In other words, in some embodiments, such a set of components may also include a third color component, so that the set includes, e.g., R. G, and B components.

In other embodiments, the plurality of components for which the scheduler schedules time slots in 502 may include a set of components that includes at least a luminance component and a color component (e.g., Y and R components). Thus, even though there may be 2 color components (in addition to a luminance component) used in total, these color components may be scheduled for transmission with only one at a time. In other embodiments, such a set of components may also include a second color component, so that the second set includes, e.g., Y, U, and V components.

In some embodiments, the plurality of components for which the scheduler schedules time slots in 502 may include a single (i.e., one and only one) time slot for each of the plurality of components. Thus, the transmitter may be configured to re-arrange the active pixels, e.g. those received from the image sensor, so that all pixel values of a first video component for a given video line are transmitted consecutively, all values of a second video component for the same line are transmitted consecutively (where the time slot for the second video component may, but does not have to be consecutive with the time slot for the first video component), and so on. In other words, in such embodiments, in each of the plurality of time slots allocated for video components, all pixels of a given video component may be transmitted consecutively within the time slot allocated to that video component. Such an implementation may advantageously concentrate energy at lower frequency which may both make the transmitted signal less susceptible to inter-symbol interference and also produce lower electromagnetic emissions from the cable when compared to approaches where different pixel values of a single video component are interleaved in the video signal transmitted to the receiver (e.g., where the pixel values of the video components are transmitted from the transmitter to the receiver in the same interleaved manner in which raw data were received from the image sensor).

In some embodiments, a combined duration of the plurality of time slots for transmitting the plurality of components of a given video line for which the scheduler schedules time slots in 502 may be equal to or shorter than a time in which that video line is provided from to the transmitter, e.g. provided from the image sensor to the transmitter. Thus, in some embodiments, time can be saved by making the duration of the video time slots shorter, e.g., by configuring a clock generator of the transmitter (e.g., a clock generator 919 shown in FIG. 9) to clock the pixels out more quickly (i.e., at a higher clock rate), which may be used to fit multiple video components and multiple control time slots. In other words, in some embodiments, a link clock rate (i.e., a clock rate at which the data is exchanged between the transmitter and the receiver over the link) may be higher (e.g., 2 times higher, or other, integer or non-integer, higher multiples) than an input pixel clock rate (i.e., a clock rate at which the input pixel data is acquired by the image sensor and/or provided to the transmitter). Such an implementation of time-compressed transmission of a video signal may advantageously allow multiple video components and data to be transmitted in the time occupied by one input video line, so that the video lines are not backed up at the transmitter (i.e., so that the transmitter does not create a bottleneck in transmitting acquired pixel data to the receiver). For example, in some embodiments, the time duration of a given output video line (i.e., the video line transmitted from the transmitter to the receiver, which video line may include a combination (in terms of time—a sum) of video component time slots, a synchronization signal, and horizontal blanking, downstream control data, and upstream control data time slots, then also, optionally, guardband(s)) may be equal to the time duration of the same video line being presented by the camera to the transmitter (i.e., the video line transmitted from the camera to the transmitter, which video line may include a combination (in terms of time—a sum) of a one or more video components, a synchronization signal, and horizontal blanking).

In some embodiments, the scheduler may be configured to select a transmission rate for the exchange of data between the transmitter and the receiver independently of the input pixel clock rate. Such a selection may, e.g., be made based on user input/configuration, or based on the input pixel clock rate, and may advantageously allow the scheduler to make more space for exchange of control data between the transmitter and the receiver.

As also shown in FIG. 5, the method 500 may include a block 504, in which a scheduler is configured to allocate one or more time slots for transmitting, from the transmitter to the receiver, over the same wired analog transmission link used to transmit the video components, e.g., the link 930 shown in FIG. 9, transmitter control data. As described above, since this is for transmission from the transmitter to the receiver, this control data is a "downstream" control data. Generally speaking, the downstream control data may include any data other than video components indicative of the active pixel values as acquired by the camera. In various embodiments, downstream control data may include data that enables one or more of 1) (re-)configuration of the receiver, or a further device communicatively coupled to the receiver, by the transmitter, or by a further device communicatively coupled to the transmitter, 2) the receiver performing a DC offset correction using statistical characteristic of selected active pixels, as described in greater detail below in a designated section, and 3) the receiver performing SAG compensation using inversion of channel characteristics, as described in greater detail below in a designated section.

As further shown in FIG. 5, the method 500 may include a block 506, in which a scheduler is configured to allocate one or more time slots for transmitting, from the receiver to the transmitter, over the same wired analog transmission link used to transmit the video components, e.g., the link 930 shown in FIG. 9, receiver control data. As described above, since this is for transmission from the receiver to the transmitter, this control data is an "upstream" control data. Thus, scheduling of time slots in accordance with the method 500 advantageously enables provision of not only downstream control data, but also upstream control data. In some embodiments, the upstream control data may include data that allows the receiver, or a further device communicatively coupled to the receiver, to (re-)configure the transmitter, or a further device communicatively coupled to the transmitter, e.g. to (re-)configure the image sensor, ISP or other component within the camera (where the camera may include the transmitter).

As the foregoing description illustrates, scheduling of time slots in accordance with the method 500 advantageously allows transmitting the video signal and upstream and downstream control data over a single wired link. In further embodiments, time slots for transmission of upstream control data may be scheduled for one video line, while time slots for transmission of downstream control data may be scheduled for another video line. In such embodiments, the method 500 is still applicable in that both upstream and downstream control data may be exchanged in the time slots allocated by the scheduler, except that operations of blocks 504 and 506 may be performed not for a single video line, but for two different video lines.

The data acquired by the camera/image sensor can be formatted in one of the several formats disclosed herein for subsequent conversion into analog form. Thus, various HD video signal formats (transmission sequences) are presented herein which enable use of more cost-effective video link architecture.

FIG. 6 is a schematic illustration of example sequences 600 and 602 of time slots for, respectively, YUV and RGB color spaces, in accordance with some embodiments of the present disclosure.

As shown in FIG. 6, the sequence 600 may include values of all Y components grouped together for transmission within a single time slot (shown in the sequence 600 as a time slot "Y"), values of all U components grouped together for transmission within a single time slot (shown in the sequence 600 as a time slot "U"), and values of all V components grouped together for transmission within a single time slot (shown in the sequence 600 as a time slot "V"). As described above, such grouping may advantageously result in the energy of all components being concentrated at lower frequencies. In other embodiments, different values of one or more of the YUV components do not have to be grouped together for transmission within a single time slot and may be interleaved. Furthermore, in other embodiments, the sequence 600 may include only two of the 3 shown video components—e.g., only Y and U, or only Y and V, because, as described above, in some embodiments the video components transmitted in a given video line may include a subset of the total video components.

The sequence 600 further illustrates a time slot for transmitting control data (shown in the sequence 600 as a time slot "D"), which may, in different embodiments, represent either only downstream or only upstream data, or represent two time slots (although not specifically shown in the sequence 600)—one for downstream and one for upstream control data. The sequence 600 further illustrates a time slot for synchronization data for the video line (shown in the sequence 600 as a time slot "S"), e.g., a horizontal sync pulse with its corresponding front and back porches, and/or any other data that may assist in synchronization. In various other embodiments, the order of the time slots of the sequence 600 may be different from that shown in FIG. 6. Furthermore, in other embodiments of the sequence 600, video line allocation proportions between the video components and other data (e.g. control and/or synchronization data) may be different from that shown in FIG. 6, without departing from the scope of the present disclosure. For example, in various embodiments, time slots for the video components may occupy about ⅔ of the total duration of a video line for transmission from the transmitter to the receiver, while other data may occupy about ⅓ of the video line.

Although not specifically shown in FIG. 5 or in the sequences of FIG. 6, in some embodiments, the scheduler may further be configured to allocate one or more guard band time slots immediately before and/or immediately after the one or more time slots for transmitting the downstream control data, and/or allocate one or more guard band time slots immediately before and/or immediately after the one or more time slots for transmitting the upstream control data. One or more of such guard band time slots may be added, e.g., between the upstream and downstream control data time slots, to allow for differences of propagation time through channels/cables of different lengths, which may advantageously reduce or prevent interference between upstream and downstream control data. During the one or more guard band time slots, a constant voltage signal may be transmitted over the link 930 by the transmitter. In some embodiments, during both the upstream control data time slot and the guard band time slots, a fixed level voltage may be output from the transmitter at a predetermined digital code level, which may serve to add an offset to the upstream control data transmitted by the receiver such that the combined signal during the upstream control time slot (when both transmitter and receiver are driving their respective signals onto the link) is at a level well above (e.g., at least 5-10% above, at least 30% above, or at least 50% above) the sync signals embedded in the downstream video signal and removes the risk of the upstream control data being interpreted as a sync signal by the receiver. In some embodiments, during the upstream control data time slot and guard band, the transmitter may be configured to find or detect a reference start signal, decode the upstream control data, check control data for errors and output on the relevant control interface.

In order to produce the transmission sequence 600, the digital video components received at the transmitter from, e.g., a camera, may be received at a predefined rate and a respective number of clock cycles may be allocated in the time slot within a video line as scheduled by the scheduler. In some embodiments, the time slots for the synchronization data S and the control data D may bookend the sequence 600.

In some embodiments, the video line may be defined by a number of clock cycles with a value or range of, for example, between 800 and 1920 pixel clock cycles per video component.

In some embodiments, the transmission sequence 600 may include providing Y' (luma or gamma compressed luminance or brightness component) as a baseband signal, while the U and V (chrominance or color blue luminance and red luminance difference, respectively) components may be transmitted as baseband signals, centered at or close to mid-scale of the selected output signal range.

In various embodiments, different video components of the sequence 600 may overlap in the frequency domain but be fully separable in the time domain. Such a sequence may advantageously prevent crosstalk between the luma/luminance and color signals, and further prevent crosstalk between U and V chrominance components.

The sequence 602 shown in FIG. 6 is analogous to the sequence 600 and, therefore, descriptions provided above for the sequence 600 are applicable to the sequence 602, except that the YUV color space is replaced with the RGB color space. In further embodiments, the format of the sequence 600 may be used with other video arrangement systems such as the Y'IQ or $YC_oC_g$ color spaces. Other color spaces are also within the scope of the present disclosure.

In some such embodiments, the Y component may be used as the baseband signal, the U and V components may be also baseband but at half of the luma (Y) bandwidth.

In other embodiments, the Y, U and V video components of the transmission sequence (or alternatively, in similar manner as the previously described sequence, the R, G, and B components, or any other video components) may be time-interleaved at the pixel level rather than at the component level. Each video line may then include alternating Y and C (i.e., alternating between U and V) data. In such a sequence, the time slots for the synchronization data S and the control data D may also bookend the video line. Thus, interleaving at the component level means arranging the pixels for transmission as [Y1Y2 . . . Yn][U1U2 . . . Un][V1V2 . . . Vn] (i.e., time-multiplexing at the component level), for the example when the video components are YUV components, whereas interleaving at the pixel level means arranging the pixels for transmission in an alternative arrangement as [Y1U1V1Y2U2V2 . . . YnUnVn] or, e.g., as [Y1U1Y2V1Y3U2Y4V2 . . . Yn–1Un/2YnVn/2], in the case where the color components are half the number of pixels of the Y component. A transmission sequence with pixel values interleaved at the pixel level may advantageously reduce the memory required in the transmitter and in the receiver compared to transmission sequence embodiments involving time-multiplexing at the component level, as it is not necessary to store and re-order all pixels of a given component before transmission, they can be transmitted largely in the order they are applied to the transmitter.

Figure 7:
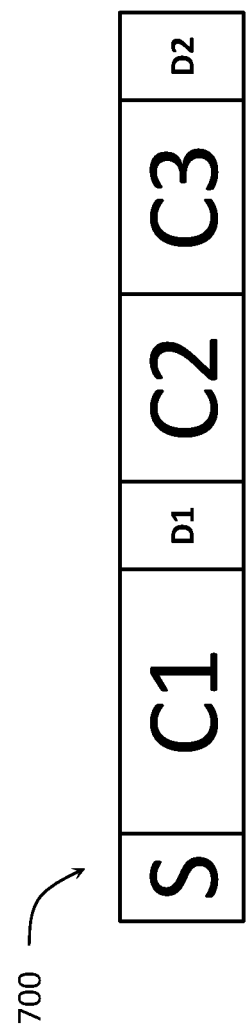
FIG. 7 is a schematic illustration of an example sequence of time slots for a video line with multiple separate control data time slots in accordance with some embodiments of the present disclosure.

In some embodiments of 504, the one or more time slots for transmitting downstream control data may include at least two different time slots which are separated from one another by one or more time slots which are not for transmitting the downstream control data. Similarly, in some embodiments of 506, the one or more time slots for transmitting the upstream control data include at least two time slots which are separated from one another by one or more time slots which are not for transmitting the upstream control data. FIG. 7 is a schematic illustration of an example sequence 700 of time slots for a video line with multiple separate control data time slots in accordance with some embodiments of the present disclosure. The video components of the sequence 700 are shown as components C1, C2, and C3, which may, e.g., be YUV or RGB color components, and S may be a time slot for the synchronization data of the video line, as described above. Most of the descriptions of the sequences 600 and 602 are applicable to the sequence 700, except that the sequence 700 specifically illustrates that, in some embodiments, control data in a given direction (e.g., in a downstream direction, or in an upstream direction) may be transmitted in time slots which are not consecutive with one another—as shown in FIG. 7 with time slots D1 and D2, separated by the transmission of video components. In various embodiments, each of D1 and D2 may contain both upstream and downstream control data time slots. Having such multiple upstream and/or multiple downstream control time slots may allow lower latency communication of control data over the link 930, e.g., as explained below.

In some embodiments, the downstream control data may include an acknowledgment (ACK) by the transmitter of the received status of the last upstream communication (received with error or received without error), or an acknowledgment or a negative-acknowledgment (NACK) from a remote device, connected to the transmitter, that may have been the ultimate destination of the last upstream communication. Similarly, the upstream control data may include an acknowledgment by the receiver of the status of the last downstream communication. Having multiple upstream and/or multiple downstream control time slots per line may allow lower latency communication of control data over the link 930 as the ACK or NACK will be received, and acted upon or responded to, more quickly (e.g., retry if error or no reply if ok) than if using only one control time slot per video line in each transmission direction.

As briefly mentioned above, in some embodiments, video and control data exchanged over the AC-coupled link 930, in particular, the downstream and/or the upstream control data, can be data not just originated at the transmitter and/or the receiver, but from further devices communicatively coupled to the transmitter and/or the receiver. In some embodiments, the upstream control data can flow from a system controller through the receiver, not just to the transmitter device itself, but to remote devices connected to that transmitter, such that one can control those remote devices through the transmitter using the system controller that may be attached to the receiver. In some embodiments, a communication could go from the receiver to the transmitter, be checked there for errors, and then, if correct, forwarded to the target device. The target device may be configured to reply with an ACK or a NACK or with data in response, which may be transmitted by the transmitter back to the receiver. The receiver may then be configured to check the received message for errors and forward data from the message to the system controller connected to the receiver. An example of such a scenario is shown in FIG. 8.

Figure 8:
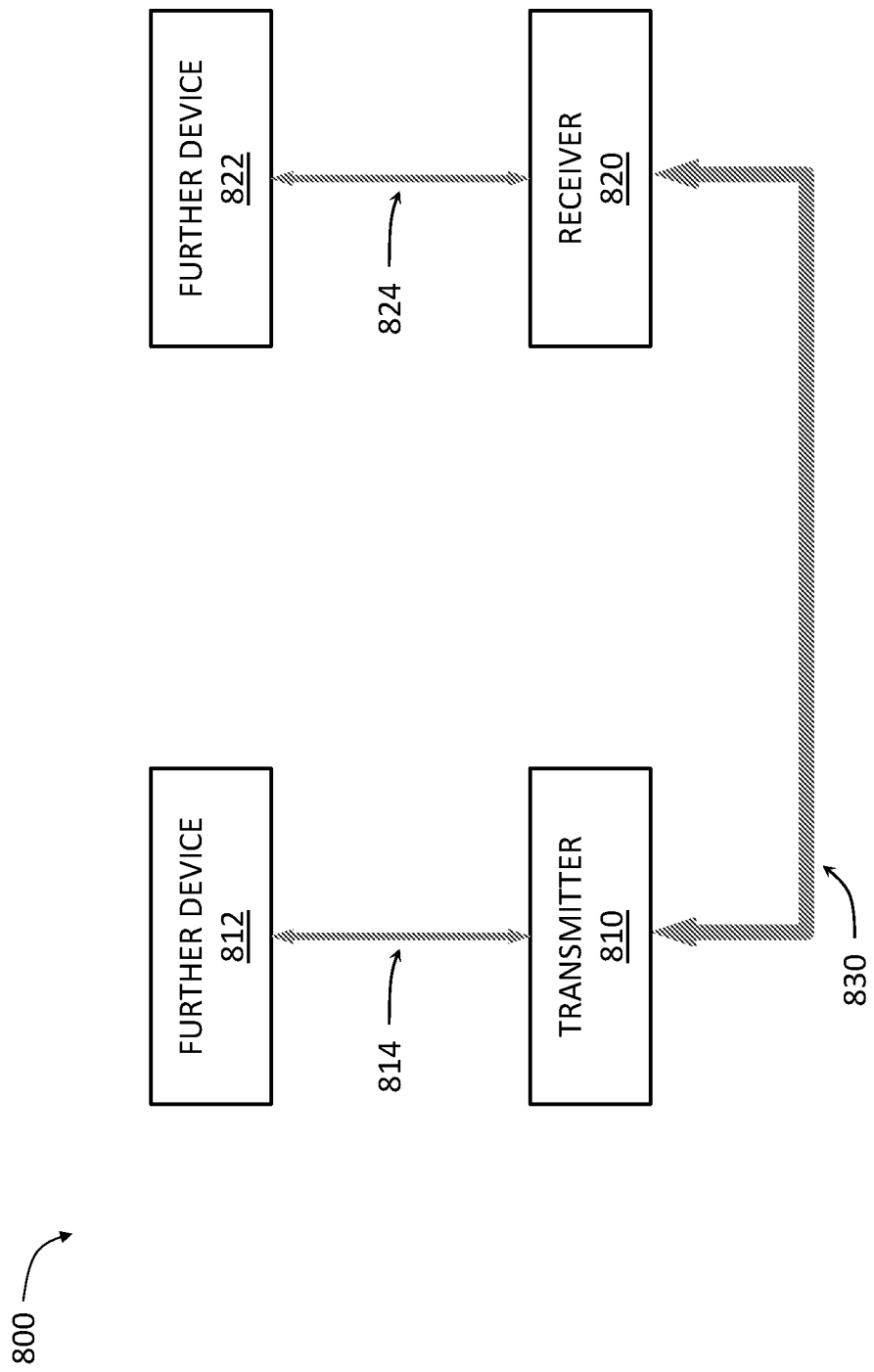
FIG. 8 is a schematic illustration of flows of control data in a video system in accordance with some embodiments of the present disclosure.

FIG. 8 is a schematic illustration of flows of control data in a video system 800 in accordance with some embodiments of the present disclosure. As shown in FIG. 8, the video system 800 may include a transmitter 810 and a receiver 820, communicatively coupled with an HD, AC-coupled video and control link 830. The transmitter 810, the receiver 820, and the link 830 may be analogous to the transmitter 910, the receiver 920, and the link 930, shown in FIG. 9 and described in greater detail below. Thus, the link 830 may be configured for bidirectional communication of control data, in addition to communication of the video signal from the transmitter 810 to the receiver 820. As also shown in FIG. 8, in some embodiments, the transmitter 810 may be communicatively coupled to a further device 812, over a link 814, and/or the receiver 820 may be communicatively coupled to a further device 822, over a link 824. Each of the links 814, 824 may be a bidirectional link, i.e., a link that allows bidirectional communication of information, and may be either a wired or a wireless link. In some embodiments, the links 814, 824 may be, e.g., inter-integrated circuit ($I^2C$) links. In some embodiments, the further device 812 may be an image processor/sensor, e.g., included in the camera module that contains the transmitter 810. In some embodiments, the further device 822 may be a system controller, e.g., a microcontroller unit (MCU). As illustrated with the flows over the links 830, 814, and 824, in such an implementation, the further device 822 and the further device 812 may communicate with one another as if they were directly connected to one another, but now with some latency caused by the presence of the link 830 in between. In some embodiments, the further device 822 may be used to (re-)configure the transmitter 810 itself, while, in other embodiments, the further device 822 may be used to (re-)configure the further device 812. Similarly, in some embodiments, the further device 812 may be used to (re-)configure the receiver 820 itself, while, in other embodiments, the further device 812 may be used to (re-) configure the further device 822.

In the following, two particularly useful types of data that may be provided from the transmitter to the receiver over the AC-coupled link described herein will be described. Both may be provided as downstream control data. The first one may be metadata used for DC offset correction, and the second one may be test pulses used for SAG compensation, in an attempt to enable the receiver to remedy deterioration in the received video signal caused by the SAG effect due to the high-pass filter behavior of the AC-coupled transmission channel.

First Example of Downstream Control Data:
Metadata for DC Offset Correction

In some embodiments, a transmitter may be configured to compute, and provide to a receiver as downstream control data, metadata indicative of a statistical characteristic for a group of active pixels of a portion of a video signal acquired by a camera (i.e., the transmitter may be configured to compute the statistical characteristic on the video signal before the signal is transmitted over the AC-coupled video link). The receiver may then be configured to compute an analogous statistical characteristic on the video signal received at the receiver over an AC-coupled video link, and to perform DC offset correction by correcting one or more values of the received video signal based on a comparison of the statistical characteristic computed by the receiver and the one computed by the transmitter (as indicated by the metadata received from the transmitter), before rendering the received video signal for display. Such an approach may advantageously allow using more data points to perform DC offset correction compared to conventional DC offset correction implementations, enabling an improvement with respect to the extent to which the video signal as recovered at the receiver side resembles that acquired by the camera at the transmitter side, resulting in an improved quality of the rendered video.

"Statistical characteristic" is a term employed herein to refer to any suitable characteristic that describes, in a quantitative manner, pixel values of a portion of the video signal to be transmitted to the receiver. A transmitter and a receiver would be in agreement as to how such a statistical characteristic is to be computed, and on which pixels of the video signal. Therefore, a comparison of such a statistical characteristic computed by the transmitter on the video signal to be transmitted and an analogous characteristic computed by the receiver on the video signal as received at the receiver, i.e., after the signal has been transmitted over an AC-coupled link, would provide a measure of the DC offset that the video signal has experienced due to the AC-coupled transmission. The receiver can then perform DC offset compensation on the received video signal based on outcome of the comparison. In this manner, the actual active pixel values of a video signal may advantageously be used in a clamping scheme, as opposed to only a small window of DC values such as the sync tip, front or back porch as was used in the conventional implementations of DC offset correction described above. Furthermore, the embodiments described herein enable do not need to assume certain predefined target values for any of the DC levels, as was also the case with the conventional implementations described above, but, rather, advantageously allow using dynamically computed "target" values (e.g., the statistical characteristic as computed by the transmitter being the "target" for performing clamping on the receiver side).

Guided by these general principles, there are many variations of how a statistical characteristic may be computed and provided from the transmitter to the receiver. Some of these variations are described below. However, in general, any statistical characteristic, computed in any manner in accordance with the principles described herein, and provided from the transmitter to the receiver in any form and over any communicative connection between the transmitter and the receiver, is within the scope of the present disclosure.

There are 3 aspects on which a transmitter and a receiver should be substantially in agreement on to benefit from the use of the statistical characteristic as described herein. The first aspect includes on which pixels of the video signal the statistical characteristic is to be computed. The second aspect includes how a statistical characteristic is to be computed, i.e. which mathematical operation is to be performed on the plurality of pixels identified/selected in accordance with the first aspect. The third aspect includes how the computed statistical characteristic computed by the transmitter is to be represented by so-called "metadata" that is then transmitted from the transmitter to the receiver to enable the receiver to perform the comparison and to further perform DC offset compensation based on the comparison. Each of these three aspects will now be described.

Regarding the first aspect, there is a balance to be achieved between the accuracy desired between the video signal as it was before the AC-coupled transmission and the video signal as it is recovered on the receiver side after the AC-coupled transmission. In some implementations, such balance may depend on the circumstances of a particular deployment scenario, e.g., computing power at the transmitter and/or the receiver, bandwidth limitations for transmitting metadata to the receiver, etc. In some embodiments, a statistical characteristic may be computed on all active pixels of each video line. Thus, one such statistical characteristic may be computed for each video line of a video frame. In other embodiments, a statistical characteristic may be computed on a certain subset of all active pixels of each video line (i.e., on a fraction of a single video line), e.g. for the first half of active pixels of each video line, or for a certain number of pixels centered substantially around a center of each video line, or for every even or every odd pixel of each video line, or on any other pixels chosen to be suitable for a particular deployment scenario. In such embodiments of a fraction of pixels of a video line used for computing a statistical characteristic, one such statistical characteristic may be computed, e.g., for each video line of a video frame. In yet other embodiments, a statistical characteristic is to be computed on pixels from two or more lines, e.g. for all pixels of two or more video lines of a video frame, or for some fractional amount of all pixels of two or more video lines (e.g. for the first half of all pixels of a first video line and the second half of all pixels of a second video line, or for all pixels of the first video line a certain number, e.g., half, of the pixels of the second video line). In such embodiments, one such statistical characteristic may be computed for every two or more video lines of a video frame, thus reducing the burden on both the computing resources used to compute the statistical characteristic and the bandwidth used for transmitting the statistical characteristic from the transmitter to the receiver, while potentially sacrificing the accuracy as the video signal may have pixel values that differ significantly from one line to another. In still other examples, a statistical characteristic may be computed on all pixels from all of the horizontal lines of a given video frame, or on all pixels of every other line of a video frame, or on certain other selected pixels across a given video frame, or even on pixels from two or more video frames.

Regarding the second aspect, in some embodiments, the statistical characteristic may include a mean or an average of value of a plurality of active pixels of the video signal that were selected according to the first item described above. In other embodiments, the statistical characteristic may include a sum of all pixel values of such a plurality of active pixels. In still other embodiments, the statistical characteristic may include a median of all pixel values, or any other numerical characteristic providing a useful indication of the pixel values of the selected pixels. It should be noted that, while descriptions provided below refer to a single statistical characteristic computed for a certain plurality of pixel values (which were selected, e.g., in accordance with the first aspect described above), in other embodiments, multiple such characteristics may be computed by the transmitter and the receiver for a given plurality of pixel values, and the DC offset correction may be performed based on one or more of these statistical characteristics. For example, in some embodiments, a transmitter may be configured to compute both an average value and a sum of a plurality of certain pixel values of a video signal, and then provide both the average and the sum to the receiver. Since the receiver is in agreement with the transmitter, the receiver would also compute both the average and the sum but now for the analogous pixels of the received video signal, and then perform DC offset correction based on comparison of each of these two different statistical characteristics as computed by the transmitter and the receiver.

Regarding the third aspect, "metadata" is a term used herein to describe some representation of the statistical characteristic computed by the transmitter. Again, there are many possible variations of how metadata could be generated based on the statistical characteristic computed by the transmitter, all of which being within the scope of the present disclosure. In some embodiments, the metadata may simply include the statistical characteristic as it was computed by the transmitter. In other embodiments, the metadata may include some encoded version of the statistical characteristic computed by the transmitter. For example, the computed value of the statistical characteristic may be seen as being, or belonging to, one of a plurality of predefined levels, e.g. 10 levels, and the metadata may be an indication of the particular level to which the computed value corresponds. In still other embodiments, the metadata may be not a complete value of the statistical characteristic computed by the transmitter but only a certain number of the least significant bits (LSBs). For example, considering that the statistical characteristic computed by the transmitter may be a digital value having M bits, where M is equal to or greater than 2, then the metadata may be the N LSBs of the M-bit word of the statistical characteristic, where N is greater than zero and less than M (e.g., M could be equal to 7 and N could be equal to 3). Such embodiments are based on a realization that the values of the statistical characteristic computed at the transmitter and at the receiver are not expected to differ significantly, and that, therefore, providing only a certain number of LSBs from the transmitter to the receiver will be sufficient for the receiver to be able to determine how to modify the values of the received video signal based on the comparison of the LSBs represented by the metadata and the value of the statistical characteristic computed by the receiver.

As described above, the receiver is configured to compare the statistical characteristic that the receiver computed to that computed by the transmitter (the latter being indicated by the metadata that the receiver received) and to perform DC offset correction of one or more values of the received video signal based on said comparison. For example, in some embodiments, the comparison may include simply determining the difference between the two values of the statistical characteristic, and DC offset correction may include clamping by shifting the one or more values of the received video signal by said difference. In other embodiments, the comparison may take more complicated forms, as long as the DC offset correction performed is decided to provide an improvement as to how the received video signal resembles that being transmitted by the transmitter.

There are also many different embodiments as to which values of the received video signal the receiver is configured to correct based on the metadata received as downstream control data. In some embodiments, the receiver may be configured to apply the DC offset correction to only those pixel values of the video signal on which the statistical characteristic was computed. In other embodiments, the receiver may be configured to apply the DC offset correction on a subset of those pixel values. In still other embodiments, the receiver may be configured to apply the DC offset correction on a larger number of pixels than those for which the statistical characteristic was computed. For example, the statistical characteristic may be computed for pixel values of every other line, and the receiver may be configured to apply the DC offset correction on both lines for each value of the statistical characteristic received. It should also be noted that the DC offset correction may be applied to the values of the video signal other than the pixel values, e.g., to the values of the sync signals (horizontal and/or vertical sync signals), front porches, and/or back porches of the sync signals, etc.

Second Example of Downstream Control Data: Test Pulses for SAG Compensation

As a second example of downstream data that may be provided over the HD, AC-coupled video and control link described herein, is a plurality of test pulses, provided by the transmitter, and configured to enable the receiver to apply one or more SAG compensation techniques to the plurality of video components received from the transmitter over the same link. In particular, the test pulses may provide the predefined/known content that can enable the receiver to implement adaptive filtering to compensate for the SAG effect imparted on the video signal as a result of having been transmitted over the AC-coupled link described herein. In some embodiments, an example adaptive filtering method may include applying a filter to a video signal received over the AC-coupled link to generate a corrected video signal, where a transfer function of the filter is dependent on a link parameter (a parameter) that is based on a plurality of parameters of the AC-coupled link (such as various resistances and capacitances of the AC-coupled link). The method may further include extracting predefined (i.e., known) content from the corrected video signal (which may be implemented as the test pulses provided in the downstream direction from the transmitter to the receiver), and adjusting the link parameter a based on a comparison of the extracted predefined content with certain expected content (i.e., expected predefined/known content), so that adjusted transmission parameter can be used for one or more subsequent applications of the filter, thereby realizing an adaptive filter. Using an adaptive filter to compensate for the SAG effect may advantageously allow accounting for changes in the values of the parameters of the AC-coupled link due to one or more of process, voltage, and/or temperature (PVT) variations, resulting in improved SAG compensation results, compared to prior art approaches. It should be noted that, while in some embodiments, such test pulses may be considered to be part of control data provided in the downstream direction because they are provided additionally to the video signal, in other embodiments, such test pulses may be a part of the video signal, e.g., horizontal and/or vertical synchronization pulses, in which case they may be considered to be a part of the video signal as opposed to "control data" per say. In either case, the test pulses provided from the transmitter to the receiver to provide "known content" that allows the receiver to perform SAG effect compensation may be considered as downstream data provided in appropriate time slots over the AC-coupled video and control link, as described herein.

In a further example, in some embodiments, the downstream data could also include a test pulse or plurality of test pulses, which could be either the same or different from the pulses used by the receiver to apply one or more SAG compensation techniques. The plurality of test pulses, described above, may be used to assist the receiver in applying one or more equalization techniques for compensating for inter-symbol interference caused by the limited bandwidth of the transmission channel and/or compensating for reflections caused by impedance mismatch, between cable and termination resistors, or between different sections of the transmission cable and/or to enable the receiver to apply clock phase recovery techniques such that each pixel on the link is sampled individually and at a point where it is at a stable value rather than in transition between adjacent pixel values. Similar to the test pulses for SAG compensation, described above, the test pulse or pulses provided to the receiver for implementing equalization techniques, compensating for reflections, and/or applying clock phase recovery techniques may, in some embodiments, be considered to be part of control data provided in the downstream direction because they are provided in addition to the video signal, while, in other embodiments, such test pulses may be a part of the video signal.

Example Video System

FIG. 9 illustrates an example video system 900, according to some embodiments of the present disclosure. As shown in FIG. 9, the example system 900 may include a transmitter 910 and a receiver 920 coupled by an AC-coupled link 930. The AC-coupled link 930 may be any suitable wired conductor cable, e.g., the single-ended conductor cable 108 or the differential-pair cable 208, described above.

As shown in FIG. 9, the transmitter 910 may include, or be communicatively coupled to, a video signal generator 912. The video signal generator 912 may include any suitable means for generating a signal to be transmitted to the receiver 920 over the AC-coupled link 930. For example, in some embodiments, the video signal generator 912 may include any suitable image sensor, ISP or camera (which may include a plurality of cameras) configured to acquire a video signal (which may include a plurality of video signals). In other embodiments, the signal generator 912 may include means for producing a computer-generated video signal.

As further shown in FIG. 9, the transmitter 910 may also include, or be communicatively coupled to, one or more converters 914. The converters 914 may include digital-to-analog converters (DACs) and/or analog-to-digital converters (ADCs), and may be provided with clock signals generated by a clock generator 919, e.g., under the control of the processor 915.

As used herein, the term "DAC" refers to an electronic circuit/device that converts a digital value that represents an amplitude of a continuous physical quantity to a corresponding analog value. In some embodiments, the one or more DACs within the converters 914 may be configured to receive a digital signal generated by the signal generator 912, e.g., to receive a digital video signal comprising digital pixel values as acquired by the camera, and convert the digital values (i.e., discrete-time and discrete-amplitude values of the digital signal) to a continuous-time and continuous-amplitude analog signal. In some embodiments, the one or more DACs within the converters 914 may be configured to receive a processed version of the digital signal generated by the signal generator 912, e.g., as processed by the transmitter logic 916 to include downstream control data (e.g., metadata) as described herein, formed for transmission in any of the transmission sequences described herein, and to convert that signal to analog domain for AC-coupled transmission to the receiver over the AC-coupled link 930.

As used herein, the term "ADC" refers to an electronic circuit/device that converts a continuous physical quantity carried by an analog signal to a digital number that represents the quantity's amplitude (or to a digital signal carrying that digital number). The result is a sequence of digital values (i.e., a digital signal) that has converted a continuous-time and continuous-amplitude analog input signal to a discrete-time and discrete-amplitude (single bit or multi-bit) digital signal. In case of the one or more ADCs within the converters 914 used in the video system 900, the analog input signal being converted may be the upstream control data received from the receiver 920 over the AC-coupled video and control link 930, as described herein, e.g., to be further processed in digital form by the transmitter logic 916.

As also shown in FIG. 9, the transmitter 910 may further include, or be communicatively coupled to, transmitter logic 916. The transmitter logic 916 may be implemented in hardware, software, firmware, or any suitable combination of the one or more of these, and may be configured to control the operation of the transmitter 910 as described herein. To that end, the transmitter logic 916 may make use of at least one processor 915 and at least one memory element 917 along with any other suitable hardware and/or software to enable its intended functionality as described herein. Some of the functionality of the transmitter logic 916 may include acting as a scheduler to schedule at least some of the time slots as well as preparing video and control data for transmission to the receiver over the AC-coupled link 930, as described herein. In some embodiments, the processor 915 can execute software or an algorithm to perform the activities as discussed in the present disclosure, e.g., the processor 915 can execute the algorithms that control digital-to-analog conversion of signals generated by the signal generator 912 for transmission over the analog transmission link 930 and/or execute the algorithms that control analog-to-digital conversion of upstream control data received from the receiver 920 over the analog transmission link 930. In another example, the processor 915 can execute algorithms that control generation and transmission of downstream control data (e.g., metadata, various acknowledgments, etc.) to the receiver 920 as described herein. Further descriptions of the processor 915 and the memory element 917 are provided below.

Also shown in FIG. 9 is that the transmitter 910 may also include, or be communicatively coupled to, transmission (TX) and reception (RX), i.e. TX/RX, circuitry 918 for transmitting video and downstream control data to the receiver 920 and receiving upstream control data from the receiver 920, over the analog transmission link 930. In particular, the TX/RX circuitry 918 may include components for enabling AC-coupled transmission of transmission sequences with video and downstream control data in their allocated time slots as described herein. In some embodiments, the TX/RX circuitry 918 may obtain such transmission sequence from, e.g., the DAC within the converters 914, the transmission sequences processed (e.g., prepared) by the transmitter logic 916. Furthermore, the TX/RX circuitry 918 may include components for enabling AC-coupled receipt of upstream control data within any of the transmission sequences, in allocated time slots, as described herein. In some embodiments, the TX/RX circuitry 918 may provide such upstream control data to the ADC within the converters 914 and/or directly to the transmitter logic 916 for further processing as described herein. In some embodiments, components of the TX/RX circuitry 918 may include coupling capacitors, e.g., coupling capacitors on the transmitter side as described with reference to FIGS. 1 and 2, as well as any other circuitry as known in the art to be used for AC-coupled analog transmission and receipt of signals.

Turning to the receiving side of the video system 900, as shown in FIG. 9, the receiver 920 may include, or be communicatively coupled to, TX/RX circuitry 928, receiver logic 926, one or more converters 924, and, optionally, a video consumption device 922. The video consumption device 922, may, in some embodiments, be a video processing device such as an ISP, a video analysis device, such as an ADAS processor, or a video rendering device such as a display.

Similar to the converters 914, the converters 924 may include one or more ADCs and one or more DACs, and may be provided with clock signals generated by a clock generator 929, e.g., under the control of the processor 925. In case of the ADC within the converters 924 used in the video system 900, the analog input signal being converted may be the video and downstream control data transmission sequence as described above, transmitted from the transmitter 910 over the AC-coupled video and control link 930 and received by the TX/RX circuitry 928, e.g., to be further processed in digital form by the receiver logic 926. In case of the DAC within the converters 924 used in the video system 900, the digital input signal being converted may be the upstream control data as described above, to be transmitted from the receiver 920 to the transmitter 910 over the AC-coupled video and control link 930.

The TX/RX circuitry 928 may be configured to receive signals from the transmitter 910. In particular, the TX/RX circuitry 928 may include components for enabling receipt of AC-coupled video and downstream control data in any of the analog transmission sequences as described herein, e.g., to be provided to one or more ADCs within the converters 924 for conversion to digital and to be provided to the receiver logic 926 for further processing, possibly after conversion by the converter(s) 924. In addition, the TX/RX circuitry 928 may be configured to transmit upstream control signals from the receiver 920 to the transmitter 910, in allocated time slots within transmission sequences as described herein. In some embodiments, components of the TX/RX circuitry 928 may include coupling capacitors, e.g., coupling capacitors on the receiver side as described with reference to FIGS. 1 and 2, as well as any other circuitry as known in the art to be used for receipt and transmission of AC-coupled analog signals.

Similar to the transmitter logic 916, the receiver logic 926 may be implemented in hardware, software, firmware, or any suitable combination of the one or more of these, and may be configured to control the operation of the receiver 920, as described herein. To that end, the receiver logic 926 may make use of at least one processor 925 and at least one memory element 927 along with any other suitable hardware and/or software to enable its intended functionality as described herein. In some embodiments, the processor 925 can execute software or an algorithm to perform the activities as discussed in the present disclosure, e.g., the processor 925 can execute the algorithms that control analog-to-digital conversion of signals received by the TX/RX circuitry 928 after having been transmitted over the analog transmission link 930, possibly after having been converted to digital domain by the ADC 924. Furthermore, the processor 925 can execute algorithms that control receipt and processing of downstream control data from the transmitter 910, as described herein. Furthermore, the processor 925 can execute algorithms that lock to the synchronization signals embedded in the downstream signal and control the generation of a line-locked link clock by clock generator 929, which is used to ensure pixel-accurate sampling of the downstream signal by ADC within the converters 924. Still further, the processor 925 can execute algorithms that control transmission and processing of upstream control data for transmission from the receiver 920 to the transmitter 910, as described herein. Further descriptions of the processor 925 and the memory element 927 are provided below.

Each of the processors 915, 925 may be configured to communicatively couple to other system elements via one or more interconnects or buses. Such a processor may include any combination of hardware, software, or firmware providing programmable logic, including by way of non-limiting example a microprocessor, a digital signal processor (DSP), a field-programmable gate array (FPGA), a programmable logic array (PLA), an application specific IC (ASIC), or a virtual machine processor. The processor 915 may be communicatively coupled to the memory element 917, while the processor 925 may be communicatively coupled to the memory element 927, for example in a direct-memory access (DMA) configuration. Each of the memory elements 917, 927 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory items discussed herein should be construed as being encompassed within the broad term "memory element."

The information being tracked or sent to the one or more components/elements of the transmitter 910 and of the receiver 920 could be provided and/or stored in any database, register, control list, cache, or storage structure, all of which can be referenced at any suitable timeframe. Any such storage options may be included within the broad term "memory element" as used herein and may be used to implement the memory element 917 and/or memory element 927. Similarly, any of the potential processing elements, modules, and machines described herein should be construed as being encompassed within the broad term "processor" as used herein and may be used to implement the processor 915 and/or the processor 925. Each of the elements shown in FIG. 9, e.g., the signal generator 912, the converters 914, the transmitter logic 916, the signal rendering 922, the converters 924, or the receiver logic 926, can also include suitable interfaces for receiving, transmitting, and/or otherwise communicating data or information in a network environment, either over wired or a wireless communications link.

In certain example implementations, mechanisms for providing transmission sequences for transmitting video and control data over an AC-coupled link as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g., the memory elements 917 and 927 shown in FIG. 9, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g., the processors 915 and 925 shown in FIG. 9, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

Example Data Processing System

Figure 10:
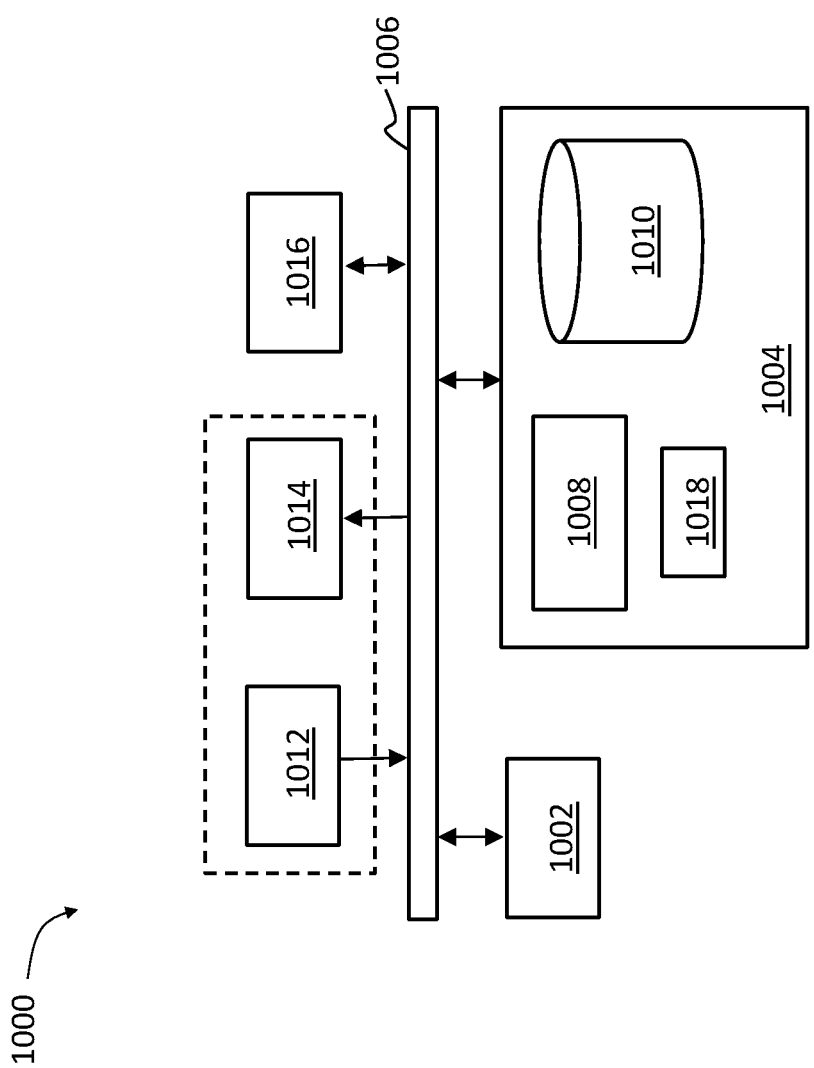
FIG. 10 provides a block diagram illustrating an example data processing system in accordance with some embodiments of the present disclosure.

FIG. 10 provides a block diagram illustrating an example data processing system for implementing generation, scheduling, and packaging of video and control data for transmission over an HD, AC-coupled video and control link (e.g., the link 930) as disclosed herein, according to some embodiments of the present disclosure. Such a data processing system could be configured to, e.g., function as the transmitter logic 916 and/or as the receiver logic 926 described herein or as any other system configured to implement various improved mechanisms related to scheduling of time slots for transmission of video and bidirectional control data as AC-coupled signals, as disclosed herein.

As shown in FIG. 10, the data processing system 1000 may include at least one processor 1002 coupled to memory elements 1004 through a system bus 1006. As such, the data processing system may store program code within memory elements 1004. Further, the processor 1002 may execute the program code accessed from the memory elements 1004 via a system bus 1006. In one aspect, the data processing system may be implemented as a computer that is suitable for storing and/or executing program code. It should be appreciated, however, that the data processing system 1000 may be implemented in the form of any system including a processor and a memory that is capable of performing the functions described within the present disclosure.

In some embodiments, the processor 1002 may be the processor 915 and the memory elements 1004 may be the memory elements 917 of the transmitter 910 of the video system 900 shown in FIG. 9, as described above. In some embodiments, the processor 1002 may be the processor 925 and the memory elements 1004 may be the memory elements 927 of the receiver 920 of the video system 900 shown in FIG. 9, as described above.

The memory elements 1004 may include one or more physical memory devices such as, for example, local memory 1008 and one or more bulk storage devices 1010. The local memory may refer to RAM or other non-persistent memory device(s) generally used during actual execution of the program code. A bulk storage device may be implemented as a hard drive or other persistent data storage device. The processing system 1000 may also include one or more cache memories (not shown) that provide temporary storage of at least some program code in order to reduce the number of times program code must be retrieved from the bulk storage device 1010 during execution.

Input/output (I/O) devices depicted as an input device 1012 and an output device 1014, optionally, can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 1012 and the output device 1014). An example of such a combined device is a touch sensitive display, also sometimes referred to as a "touch screen display" or simply "touch screen". In such an embodiment, input to the device may be provided by a movement of a physical object, such as e.g., a stylus or a finger of a user, on or near the touch screen display.

When used in a video system according to various embodiments of the present disclosure, e.g. in the video system 900 shown in FIG. 9, the input device 1012 may be used to receive input, e.g., as provided by a user, and to configure the video system 900 in accordance with the user input. The transmitter 910 and the receiver 920 of the video system 900 may then be configured in accordance with the input received by the input device 1012.

A network adapter 1016 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1000, and a data transmitter for transmitting data from the data processing system 1000 to said systems, devices and/or networks. Modems, cable modems, and Ethernet cards are examples of different types of network adapter that may be used with the data processing system 1000.

When used in a video system according to various embodiments of the present disclosure, e.g. in the video system 900 shown in FIG. 9, the network adapter 1016 may be used to receive input from other systems, computer systems, remote network devices, and/or remote storage devices through intervening private or public networks, and to configure the video system 900 in accordance with the received input. For example, the network adapter 1016 may be configured to receive examples of input as described with reference to the input received by the input device 1012 from the user, except that now it would be received from other systems, computer systems, remote network devices, and/or remote storage devices through intervening private or public networks. The transmitter 910 and the receiver 920 of the video system 900 may then be configured in accordance with the input received by the network adapter 1016.

As pictured in FIG. 10, the memory elements 1004 may store an application 1018. In various embodiments, the application 1018 may be stored in the local memory 1008, the one or more bulk storage devices 1010, or apart from the local memory and the bulk storage devices. It should be appreciated that the data processing system 1000 may further execute an operating system (not shown in FIG. 10) that can facilitate execution of the application 1018. The application 1018, being implemented in the form of executable program code, can be executed by the data processing system 1000, e.g., by the processor 1002. Responsive to executing the application, the data processing system 1000 may be configured to perform one or more operations or method steps described herein.

Further Variations and Modifications

This section is intended to provide further details and possible variations and modifications to video system described herein, e.g. the video system 900, in particular with respect to video and control data transmission over an HD, AC-coupled transmission link, e.g., the link 930, as described herein.

Figure 11:
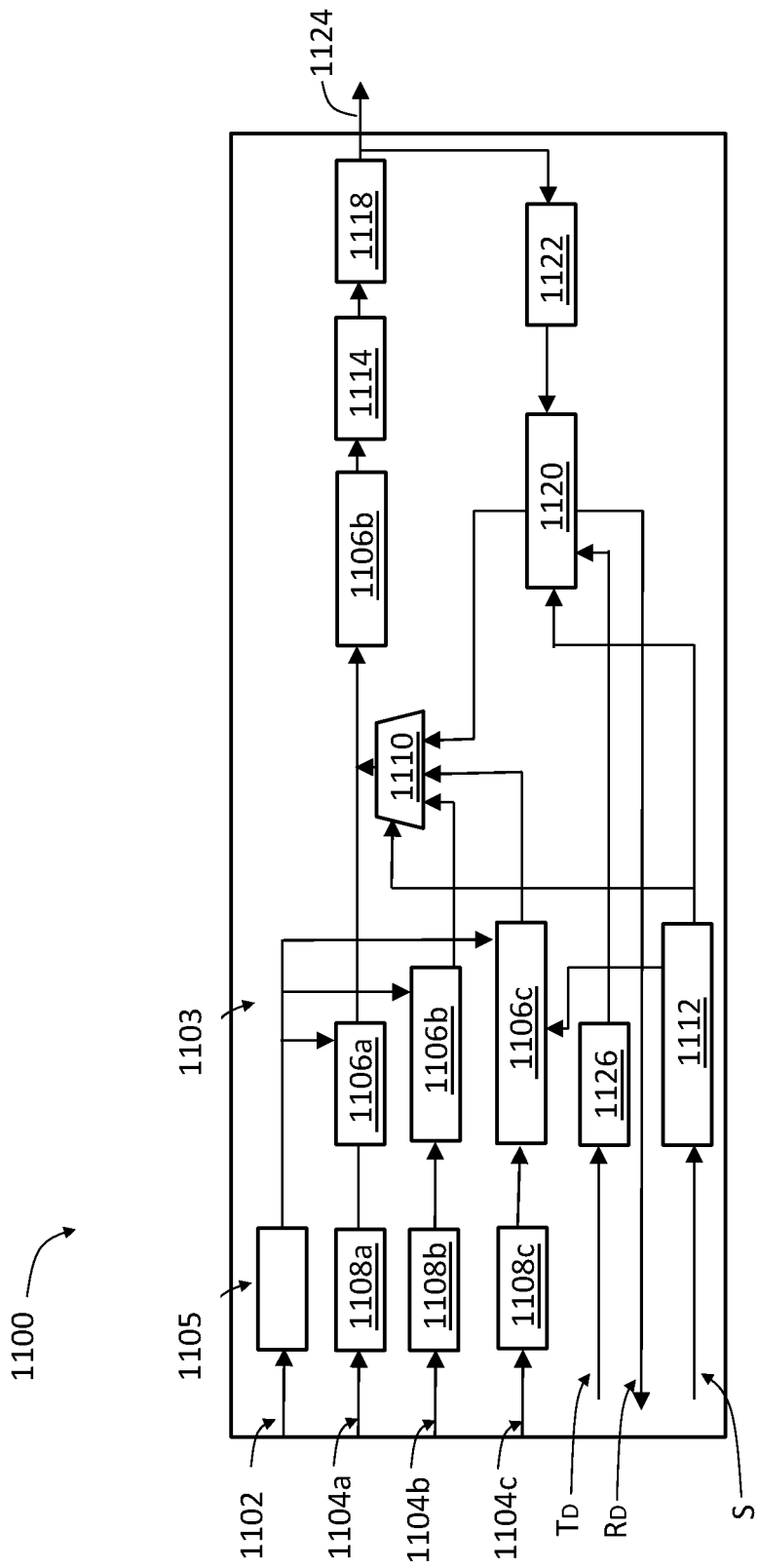
FIG. 11 provides a block diagram illustrating an encoder/transmitter in accordance with some embodiments of the present disclosure.

FIG. 11 shows a schematic diagram of an encoding scheme/encoder 1100 according to some embodiments of the present disclosure. As depicted in FIG. 11, digital video input data, which may be RGB video data, YUV video data, or any other color space data, possibly processed by an ISP, may be provided to an encoder as video component parts (as contrasted with composite video). In some embodiments, the encoder 1100 may be the transmitter 910, described above. The video component parts are denoted in FIG. 11 as signals 1104a, 1104b, and 1104c, and, e.g., may include a luminance component 1104a (e.g. Y or Y' luminance component) and color difference signals 1104b and 1104c (e.g. color difference signals U and V, or Pb and Pr signals). Alternatively, the component parts may include G, R, and B components of RAW input data.

In some embodiments, the sampling rate of the U and V (chrominance) component parts relative to the Y (luminance) component part may be, for example, 4:4:4 (no down-sampling of the chrominance channels), 4:2:2 (or 2:1) horizontal down-sampling, with no vertical down-sampling, that is, every scan line containing four Y samples for every two U or V samples, 4:2:0 (or 2:1) horizontal down-sampling, with 2:1 vertical down-sampling, 4:1:1 (or 4:1) horizontal down-sampling, with no vertical down-sampling. Analogous scheme may be applicable to video components 1104 other than YUV components. In various embodiments, any magnitude or degree of vertical down-sampling and/or horizontal down-sampling may be employed alone or in combination without departing from the scope of the present disclosure.

The data may enter the encoder over a parallel or serial digital interface/port connecting the image sensor with the encoder. A serial digital interface may advantageously require fewer pins for data transmission than a parallel digital interface. Signals may be received from a single or multiple cameras or image sensors. For example, in an ADAS system, cameras may be arranged on different parts of the vehicle, each facing a different direction (although their fields of view may overlap). In such case, the signals generated by the various image sensors may be provided in sequential form, or alternatively, may be combined or intercalated. Additionally, the camera(s)/image sensor(s) within a system may be static (that is, always facing the same direction), or they may be dynamic (changing direction based on mechanical or manual input by a user or based on automated input executed by a controlling device), or a combination of both. The terms camera and image sensor may be used interchangeably throughout the disclosure as the source of video data to be transmitted.

The component video parts 1104a, 1104b, and 1104c may be provided to respective data buffering blocks 1106a, 1106b, and 1106c. In some embodiments, the data buffering blocks 1106a,b,c may include, for example, first in first out (FIFO) data buffers. A clock signal 1102 may be provided to the buffers 1106. In some embodiments, the clock signal 1102 may be provided via a phase-locked loop (PLL) 1105, which may be configured to, for example, double the input clock frequency or multiply the input clock frequency by a predefined and/or user-defined factor (for example, a factor of 2, or other integer or non-integer multiple).

In some embodiments, the component video parts 1104a, b, c may be provided to respective low-pass filers (LPF) 1108a, b, c prior to buffering. The LPFs 1108 may be configured differently for each of the component parts/signals. For example, the LPF for the luminance component may be bypassed or may otherwise be configured to accommodate a full sampling rate (that is, no decimation), while the LPF for the chrominance (color differential) components may apply filtering and down-sampling such that they may have a bandwidth and output data rate that is only half of, or another fraction of, that of the luminance signal. The different LPF rates may reflect the allocation proportions of the different component parts in the video line to be transmitted from the transmitter to the receiver, as described above.

Moreover, a timing generation signal may be generated at block 1112 from a synchronization pulse signal S, and this timing generation signal may also be provided to the multiplexer block 1110. The block 1112 may also be responsible for generating downstream control data to provide from the transmitter to the receiver in the respective allocated time slots as described above.

The output signals of the data buffers may be subsequently provided to at least one multiplexer 1110 for time-multiplexing (different multiplexing arrangements may be used), as well as the output signal from the control data/sync block 1112 (comprising control data as well as the synchronization signal), in order to generate a multiplexed signal output. Thus, the control data and synchronization signal may be time-multiplexed with the video data component part signals, e.g., as described above with reference to the method 500.

In the control data and synchronization signal combination/capturing block 1120, the digital synchronization signal and downstream control data may be combined and provided to the multiplexer 1110. A number of blank pixels may be added in their respective locations. In various embodiments, control data may be gathered from various sources, such as, I$^2$C, serial peripheral interface (SPI), general purpose input/output (GPIO), and other interfaces/links, and may be formatted and packed into control packets, possibly with error protection/detection codes generated and included to provide robustness in transmission. The control data may comprise transmitter data, receiver response data, and/or a combination thereof. Receiver data R$_D$ (upstream) may also be received at block 1120 and forwarded to components external to the encoder. Transmitter output data may be generated at the output of the DAC block 1118. A transmission data signal T$_D$ may also be provided to a FIFO buffer 1126 and subsequently to the control data and synchronization signal combination block 1120. The downstream control data/packets may be inserted into their allocated time slots within the video line. There may be multiple upstream and multiple downstream control time slots per video line to allow lower latency/higher throughput of control data at system level.

The resulting time-multiplexed signal may be provided to a DAC block 1118, e.g. the DAC implemented as one of the converters in 914 shown in FIG. 9, for conversion into analog format prior to transmission. An encoded analog signal 1124 may finally be output by the encoder 1100 and the combined link signal 1124, which may include both the data driven downstream by the DAC block 1118 of the transmitter and the data driven upstream by the remote receiver, is fed back to the encoder via the analog-to-digital conversion block 1122 for decoding of the upstream control data.

Optionally, in some embodiments, the time-multiplexed signal may be provided to a gain/offset adjustment block 1114. In this manner, gain/offset adjustment may be provided to the signal in its digital form, prior to analog conversion. This may advantageously provide a digital translation of the video signal levels to leave room for the Hs-horizontal synchronization pulse away from (below) active video. Alternatively or additionally, signal gain/offset adjustment may be provided after digital-to-analog conversion.

In some embodiments, the time-multiplexed signal may optionally be provided to an interpolation block 1116 prior to providing it to the DAC block 1118 and any gain/offset blocks. This may advantageously enhance the signal prior to digital-to-analog conversion and may advantageously move its spectral images higher in frequency, resulting in a preferable electromagnetic emissions spectrum and reducing the possibility of aliasing artefacts on the recovered data in the receiver.

In some embodiments, the video signal may be a 720p progressive-scan video stream comprising time-multiplexed Y, U, and V components which may be output/clocked at a frequency of 148.5 megahertz (MHz), thereby generating 1280 Y samples, 640 U samples, 640 V samples, as well as 740 sync/blanking/data/audio samples (divided between transmitter and receiver). Thus, in some embodiments, the U and V chrominance components may be down-sampled/have a lower sampling rate than the luminance component without significant loss of perceptual quality. These samples may be grouped together and time-multiplexed to compose a video signal having a video line duration of about 22.2 microseconds (μs).

In some such embodiments, the size of FIFOs 1106 may be arranged to, for example, accommodate at least one full line of different combinations of Y, U and V component samples (excluding filter latency, that is, the difference in time between the input and the response) at 8 bits each, and 740 samples of other data at 4 bits each. Additional bits per (e.g., 10, 12, or 14) may be allocated if the input digital video data is RAW image sensor data. The input video signal or line may have a 74.25 MHz clock frequency, while the output may be rendered at 148.5 MHz clock frequency, thus the data may be read out faster than the rate of input.

In some embodiments, a 1080p progressive-scan video stream may be encoded into video lines of length 22.2 μs by sampling at a rate of 297 MHz or 4400 clock cycles, which produces, for example, 1920 Y samples, 960 U samples, 960 V samples, and 560 samples which may be used for synchronization, blanking, control data, or audio data.

In some embodiments, the digital input video may be interlaced digital video.

The decoding and encoding schemes according to various embodiments of the present disclosure advantageously allow for the transmission of control data in both the upstream and downstream directions, and further enhance communication between the transmitter and receiver via control data sharing and/or exchange.

Control data generated at the receiver may be received and sent through a transmitter/receiver control data block back to the transmitter (hereinafter referred to as the transmitter-receiver data exchange block). Such data may be received by the transmitter in analog form, over the AC-coupled link described herein, and may have to be converted to a digital signal prior to processing by the transmitter. Any relevant data may be time-multiplexed back into the time-multiplexed signal for (re-)transmission.

In various embodiments, transmission of the control data may occur at different rates depending on the type of data. For example, configuration data from the receiver, e.g., data from the ECU, Head Unit (HU), or system controller to the transmitter (e.g., for the camera or image sensor), as well as any status/error data between the transmitter to the receiver, may be sent at a relatively low speed (for example, a typical I²C transmission rate). In some embodiments, a 400 kilohertz (kHz) I²C link, e.g., as shown in FIG. 8, will result in 60 μs per write (i.e., 3 lines of 720p/4 lines of 1080p).

In order to time-multiplex the control data with the video components, time slots may be respectively allocated, e.g., predefined, for upstream and downstream directions, e.g., as described above with reference to the method 500. In some embodiments, the transmitter and/or the receiver may be configured to identify and derive transmit start and stopping cues from the sync signal.

In some embodiments, the video system may be configured to account for and measure the flight time down cable through a periodic (at least once having established the video link) measurement sequence. The receiver may be configured to buffer data and send it quickly during its designated time slot(s) for transmitting upstream control data.

For example, a 400 kHz I²C transmission (3×8 bits) may take 60 s or 3 lines of 720p to be sent. Thus, it can transmit in 162 nanoseconds (ns) but must wait until the next line for response, and the response may be delayed at least until the next line. At system level, the transmitter may fake handshaking, send data, receive response, and send back to sender (e.g., using I²C pulse/clock stretching).

In some embodiments, the control data time slots may, for example, be 2.48 μs/0.94 μs wide for 720p/1080p video.

In practice, the available time in a video line may be reduced to some extent by the flight time between transmitter and receiver and back. For example, in the case of a 10 meter (m) transmission cable/wire, the flight time could amount to 100 ns, or 15 clock cycles at 148.5 MHz. In some embodiments, compensation for this time slot width reduction effect may be provided within the video system, e.g. the video system 900. For example, the effect could be measured and compensated, particularly if the transmitter and receiver time slots are on the same video line. This may be particularly important if bits of short duration are being sent. In some embodiments, flight time down the transmission cable may be accounted for by measuring through periodic (at least once upon establishing the link) measurement sequence (s).

In some embodiments of the video system 900, in order to set up the time slot, the transmitter may instruct the receiver to transmit a test pulse sequence. The receiver may transmit the test pulse at the start of the time slot relative to its received sync pulse. The transmitter may listen and measure the arrival time with respect to its own sync pulse. The transmitter may send the data to the receiver to advance its data by a specific or predefined number of samples. Alternatively, a time slot set up may involve a ping pong protocol wherein, for example, the transmitter may trigger the receiver to 'talk' or alternatively, the receiver may trigger the transmitter to 'talk'.

Figure 12:
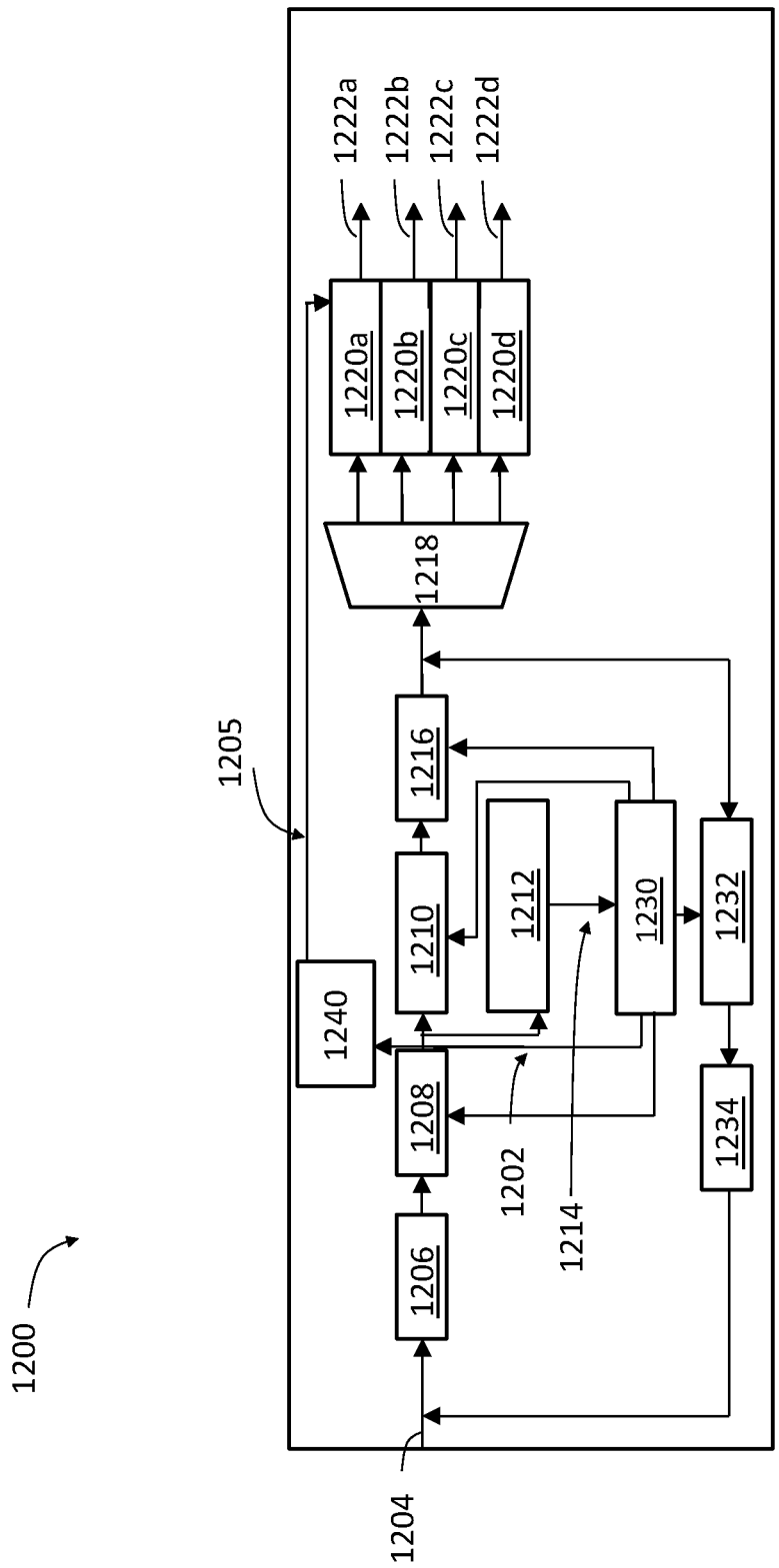
FIG. 12 provides a block diagram illustrating a decoder/receiver in accordance with some embodiments of the present disclosure.

FIG. 12 shows a schematic diagram of a decoding scheme/decoder 1200 according to an exemplary embodiment of the present disclosure. In some embodiments, the decoder 1200 may be the receiver 920, described above. As shown in FIG. 12, in some embodiments, an input signal 1204, comprising the encoded transmitter output signal, may be provided to an analog-to-digital converter 1208 for conversion into digital form. Optionally, the input signal 1204 may be provided to a clamping element 1206 prior to the analog-to-digital conversion, which may advantageously anchor the vertical position of the signal to counteract variations in the average picture level (APL), particularly suitable for AC-coupled transmission links as described herein, as the bias voltage may change with the video content. A clamping device may help to keep the relevant levels constant, regardless of the video or sync amplitude. In some embodiments, the clamp device 1206 may comprise, for example, a sync tip clamp, or a diode clamp.

The signal may subsequently be provided to a gain/offset correction block 1210, as well as a synchronization or 'sync' detection block 1212. The sync detection block 1212 may output a timing reference signal 1214, which may then be used by timing generation block 1230 to provide timing signals to other blocks in the receiver, including the gain/offset block 1210, the combined upstream control data formatting/downstream control data recovery block 1232 and an optional filter 1216.

In some embodiments, the processed input signal 1204 may be forwarded to a de-multiplexing block 1218, where it is de-multiplexed into separate components (that is, the three video component parts and the control data signal) which are provided to respective buffers 1220a, b, c, d. The buffers may comprise FIFO buffers. The buffer size may, for example, be selected accordingly in order to accommodate the required number of pixels per line of the component part signals. Thus, the buffer size may be different for different component parts. Alternatively, the buffer may be scaled accordingly when dealing with various signal types or structures, such as RAW data. The FIFO buffers may respectively output the component signals 1222a, b, c and the control data signal 1222d.

A link clock signal 1202 may be recovered from the sync pulses embedded in the downstream video transmission by a sync detect block 1212 and a timing generation block 1230. The link clock may be provided to a frequency divider block 1240, which may divide the clock frequency by a certain factor, e.g., by 2 to produce one or more pixel read clocks 1205. The block 1240 may include a PLL or frequency synthesizer enabling it to perform division by integer or non-integer ratios. The pixel read clock signal 1205 may subsequently also be provided to the plurality of buffers 1220a, b, c, d.

The combined upstream control data formatting/downstream control data recovery block 1232 may receive any control data (whether timing or video content related) from the processed input signal 1204 and provide any relevant data back to the transmitter via the DAC block 1234.

Figure 13:
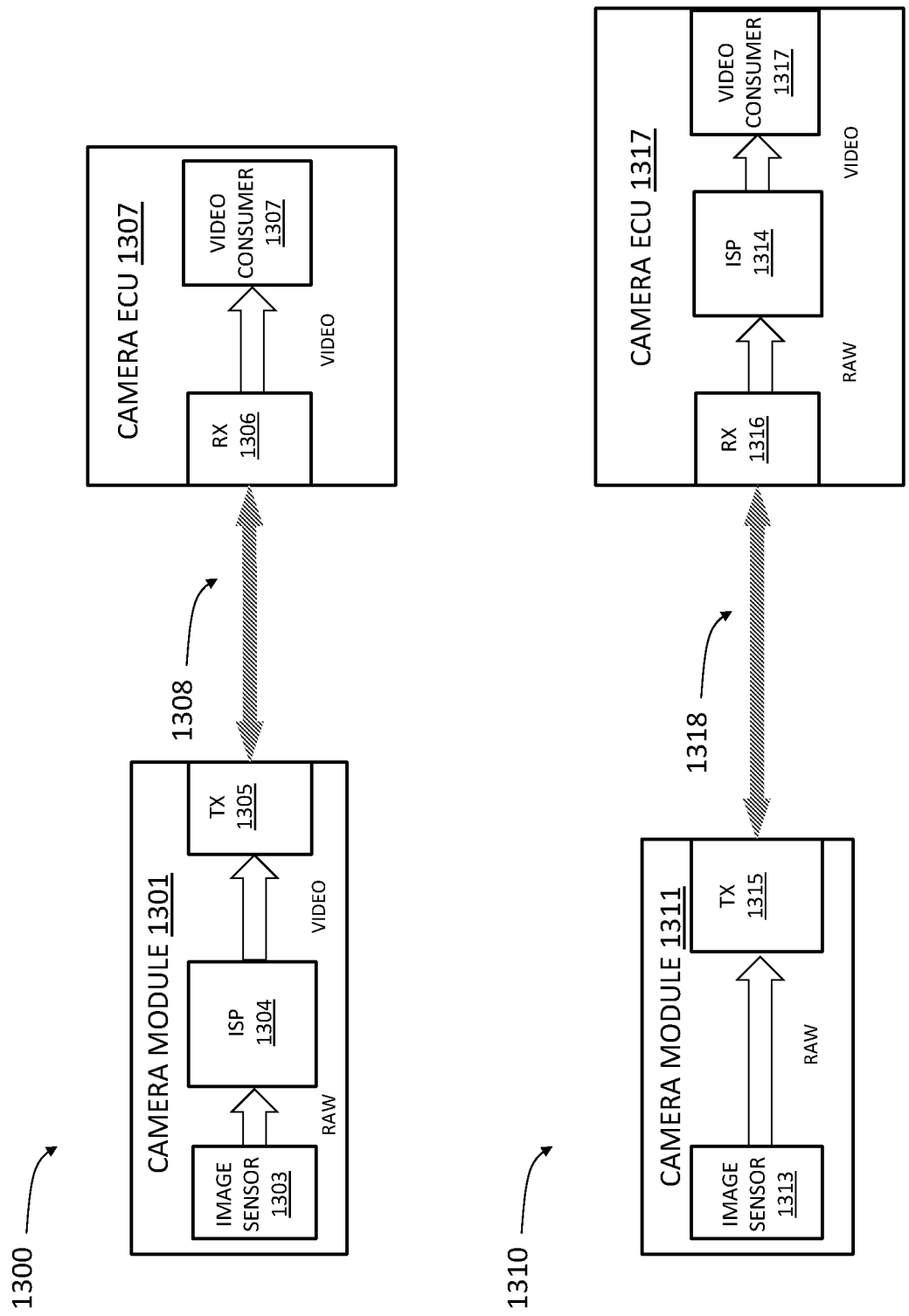
FIG. 13 provides a block diagram illustrating two example video system architectures in accordance with some embodiments of the present disclosure.

FIG. 13 provides a block diagram illustrating two example video system architectures in accordance with some embodiments of the present disclosure.

Referring to the system architecture 1300 (the upper image shown in FIG. 13), within a camera module 1301, RAW image data may be generated by an image sensor 1303, converted into YUV video by an ISP 1304, and prepared for transmission over a cable 1308 by a transmitter 1305, where the transmitter 1305 may be any of the transmitters described herein (e.g., the transmitter 910 shown in FIG. 9). Within an ECU 1307, the transmission is received by a receiver 1306, where the receiver 1306 may be any of the receivers described herein (e.g., the receiver 920 shown in FIG. 9), which decodes and outputs the video as YUV video data to a video consumer 1307 (e.g., the video consumption device 922 shown in FIG. 9). While not explicitly shown, upstream control data, carrying, for example I2C transactions, GPIOs and/or frame sync reference signals, may flow from receiver 1306 over the same cable 1308 to transmitter 1305 and/or beyond to ISP 1304 and/or image sensor 1303.

Now referring to the alternative system architecture 1310 (the lower image shown in FIG. 13), within a camera module 1311, RAW image data may be generated by an image sensor 1313, and prepared for transmission over a cable 1318 by a transmitter 1315, where the transmitter 1315 may be any of the transmitters described herein (e.g., the transmitter 910 shown in FIG. 9). Within an ECU 1317, the transmission is received by a receiver 1316, where the receiver 1316 may be any of the receivers described herein (e.g., the receiver 920 shown in FIG. 9), which decodes and outputs the video as RAW image data to ISP 1314, which produces YUV video data and outputs it to a video consumer 1317 (e.g., the video consumption device 922 shown in FIG. 9). While not explicitly shown, upstream control data, carrying, for example I2C transactions, GPIOs and/or frame sync reference signals, may flow from receiver 1316 over the same cable 1318 to transmitter 1315 and/or beyond to image sensor 1313. Such an architecture advantageously enables the ISP to be located in the ECU 1317 rather than in the space and power-constrained camera module 1311, an architecture that is not possible if using known analog video transmission links.

Turning to details of video transmission, in various embodiments, the video data is preferably transmitted as time-multiplexed component video. In various embodiments, the transmission may take various forms or precision levels (8-bit or full 14-bit RAW data).

In some embodiments, the component parts may be arranged into similar groups, clocked into memory and delayed by different amounts/periods of time, e.g., being read out at a faster rate that they were written such that they are time-compressed before being multiplexed together into their allocated time slots on the video line.

In some embodiments, a single video component may be spread over a number, e.g., 1 to 3, samples to provide robustness in transmission.

In some embodiments, control data may be gathered from I²C, SPI GPIO, and other interfaces, formatted and packed into control packets, with error protection/detection codes generated and added to provide robustness in transmission.

In some embodiments, downstream control packets may be inserted into their allocated time slots within the video line. In some embodiments, there may be multiple upstream and downstream control time slots per video line to allow lower latency/higher throughput of control data. In some embodiments, the link line frequency may be a multiple of the input video frequency. Thus, in some embodiments, the link clock rate may be greater than or equal to the input pixel clock rate. The link clock can be a higher integer, rational or fractional multiple of the input pixel clock rate, enabling more space for control time slots on each video line.

In some embodiments, a time slot may be kept clear by the transmitter for upstream control data to be added by other devices in the system, outside of the transmitter.

In some embodiments, the output of any of the DACs described herein may optionally be filtered in order to reduce noise or enhance certain frequency bands.

In some embodiments, during the upstream control time slot and guard band, a reference start signal may be found or detected, and upstream data are decoded, checked for errors and output on the relevant control interface.

In some embodiments, the transmission cable may be electrically terminated and may be AC-coupled at both the transmitter and receiver.

In some embodiments, a digital de-emphasis may be applied in the transmitter or encoding side and compensated by an inverse filter in the receiver or decoding side in order to control emissions from the cable.

Each video line, including vertical blanking and vertical synchronization lines may include downstream control channel time slots, as well as upstream control channel time slots. Alternatively, the downstream and upstream control channel may be provided in every other line respectively (that is, a first video line may include one or more downstream control channel time slots, and a subsequent, e.g., second, video line may include one or more upstream control channel time slots). Other variations are also possible.

In some embodiments, the video signal preferably includes a horizontal sync pulse defining a video pixel line start (start-of-line point). Alternatively, the horizontal sync pulse may define an end-of-line point. In some embodiments, the video signal preferably includes a vertical sync signal defining a vertical start-of-frame point. The combination of horizontal and vertical sync signals may form a composite sync.

In some embodiments, two control time slots per line may be provided. In other embodiments, more than two control time slots per line may be provided.

In some embodiments, Offset Correction Codes (OCC) may be included in the control data time slot(s). OCC may comprise information about the average level of the video line which can be advantageously used by the system receiver to improve the quality of the video clamping, e.g. as described above with reference to the use of metadata.

In some embodiments, an asymmetrical arrangement of control time slots may be provided. For example, in some embodiments, more upstream control time slots than downstream control time slots may be provided. In some embodiments, initialization may be reserved for the transmission of control data and no video data is transmitted during initialization thus enabling the camera module to be remotely configured over the link in a short period of time, reducing the time from power-on to configure the camera for video generation.

In some embodiments, the receiver may include a common mode tracking circuit which may be applied to the signal from the cable in order to cancel out common mode shifts induced on the cable by interferers, before it is filtered and then sampled by an ADC, whose clock frequency and phase may be controlled by a digital PLL which may be configured to lock to an embedded sync pulse within the signal to ensure there is one sample in the receiver for every pixel sent by the transmitter. The signal may pass through one or more digital processing blocks, including SAG effect correction (also referred to as SAG) to correct for artifacts due to AC-coupling, and through a digital equalizer in order to compensate for any losses and/or reflections in the cable/transmission channel. The compensated signal may then be de-multiplexed into its color components. The embedded control data may be recovered from their assigned time slots in the signal and error detection and protection codes checked for errors, with successfully received packets being acknowledged to the transmitter and packets received in error being flagged as NACK (not acknowledged) to the transmitter. Upstream control data may be inserted in the appropriate time slot(s) for transmission back up the cable to the transmitter.

Select Examples

The video and control link as described herein is an innovative new camera link technology enabling HD video over UTP cables and unshielded connectors, enabling an easy upgrade path from standard definition (SD) to HD cameras without the need to change the existing cable and connector infrastructure. The video and control link described herein enables a camera link with reduced system cost, significant weight savings and increased robustness vs. alternative solutions. The portfolio of transmitter and receiver devices as described herein enable seamless camera connectivity in a vehicle and may be particularly advantageous for automotive applications in providing a robust camera link solution for rear view cameras, surround view cameras, and electronic mirrors.

Example 1 provides a system for communicating video signals and control data in a vehicle over a wired (i.e., not wireless) analog transmission link, the system including a transmitter, a receiver, and a scheduler. The transmitter is placed at a first location within a vehicle and configured to receive a video signal acquired by an image sensor. The receiver is placed at a second location within the vehicle, where the second location is different from the first location. The scheduler is configured to allocate time slots for exchange of data between the transmitter and the receiver over the wired analog transmission link, by performing, for each of at least one or more video lines of a video frame of the video signal: allocating a plurality of time slots for transmitting, from the transmitter to the receiver, over the wired analog transmission link, a plurality of baseband (i.e. not modulated on a carrier signal) video components of an individual video line of the video frame of the video signal acquired by the image sensor, allocating one or more time slots for transmitting, from the transmitter to the receiver, over the wired analog transmission link (i.e., over the same link used to transmit the video components), transmitter control data (i.e., data sent by the transmitter, also referred to herein as "downstream" data, which data is other than video components indicative of the active pixel values as acquired by the image sensor), and allocating one or more time slots for transmitting, from the receiver to the transmitter, over the wired analog transmission link (i.e., over the same link used to transmit the video components), receiver control data (i.e., data sent by the receiver, also referred to herein as "upstream" data).

Example 2 provides the system according to example 1, where the wired analog transmission link is a single differential-pair transmission link.

Example 3 provides the system according to example 1, where the wired analog transmission link is a single-ended wire transmission link.

Example 4 provides the system according to any one of the preceding examples, where the wired analog transmission link is an AC-coupled analog transmission link between the transmitter and the receiver.

Example 5 provides the system according to example 4, where the transmitter control data includes metadata indicative of a statistical characteristic for two or more pixel values of the individual video line as acquired by the image sensor, and where the metadata is configured to enable the receiver to apply one or more DC offset correction techniques to the plurality of video components received from the transmitter.

Example 6 provides the system according to example 5, where the statistical characteristic is an average (or mean), a sum, or a median of the two or more pixel values.

Example 7 provides the system according to example 6, where the scheduler is further configured to allocate one or more time slots for transmitting, from the transmitter to the receiver, over the wired analog transmission link, a plurality of test pulses configured to enable the receiver to apply one or more SAG compensation techniques to the plurality of video components received from the transmitter. In some embodiments, the transmitter data could also include (i.e., the scheduler may be configured to allocate one or more time slots for transmitting from the transmitter to the receiver, over the wired analog transmission link) a plurality of test pulses (with could be either the same or different from the pulses of example 7) to enable the receiver to apply one or more equalization techniques and/or to enable the receiver to apply clock phase recovery techniques.

Example 8 provides the system according to any one of the preceding examples, where the one or more time slots for transmitting the transmitter control data include at least two time slots which are separated from one another by one or more time slots which are not for transmitting the transmitter control data, and/or the one or more time slots for transmitting the receiver control data include at least two time slots which are separated from one another by one or more time slots which are not for transmitting the receiver control data.

Example 9 provides the system according to any one of the preceding examples, where the scheduler is further configured to allocate one or more guardband time slots immediately before and/or immediately after the one or more time slots for transmitting the transmitter control data, and/or allocate one or more guardband time slots immediately before and/or immediately after the one or more time slots for transmitting the receiver control data, where the transmitter is configured to transmit a constant voltage signal in the one or more guardband time slots and/or in the one or more time slots for transmitting the receiver control data.

Example 10 provides the system according to any one of the preceding examples, where the plurality of components includes one of a first set of components and a second set of components, the first set of components includes at least a first color component and a second color component (e.g., G and R components), and the second set of components includes at least a luminance component and a color component (e.g., Y and R components). In some further embodiments, the first set of components may also include a third color component, so that the first set includes, e.g., R. G, and B components. In some further embodiments, the second set of components may also include a second color component, so that the second set includes, e.g., Y, U, and V components.

Example 11 provides the system according to any one of the preceding examples, where the plurality of time slots allocated for transmitting the plurality of components include a single (i.e., one and only one) time slot for each of the plurality of components.

Example 12 provides the system according to any one of the preceding examples, where a combined duration of the plurality of time slots for transmitting the plurality of components of the individual video line is equal to or shorter than a time in which the individual video line is provided from the image sensor to the transmitter.

Example 13 provides the system according to any one of the preceding examples, where the scheduler is configured to select a transmission rate for the exchange of data between the transmitter and the receiver independently of the input pixel clock rate.

Example 14 provides a video receiver for receiving data in an AC-coupled video system, the video receiver including means for receiving data over an AC-coupled analog transmission channel; means for extracting, from the received data, video signal data, where each line of the video signal data is extracted from a plurality of time slots, within the received data, allocated for transmitting a plurality of baseband video components of an individual video lines of a video frame of a video signal acquired by an image sensor; means for extracting, from the received data, downstream control data, where the downstream control data is extracted from one or more time slots, within the received data, allocated for transmitting the downstream control data; and means for transmitting, over the AC-coupled analog transmission channel, upstream control data, where the upstream control data is transmitted in one or more time slots allocated for transmitting the upstream control data.

Example 15 provides the video receiver according to example 14, where the video receiver is provided in a first location within the vehicle, and the image sensor is provided within a second location within the vehicle, the second location being different from the first location.

Example 16 provides the video receiver according to examples 14 or 15, where the video receiver is configured to receive the data from a transmitter, is communicatively coupled to a further device, and is configured to use the upstream control data and/or downstream control data to perform one or more of assist the further device in modifying operational settings of the transmitter or of one or more devices communicatively coupled to the transmitter (e.g. image sensor and/or ISP), read status information of the transmitter or of the one or more devices communicatively coupled to the transmitter.

Example 17 provides the video receiver according to example 16, where the further device is a system controller or a microcontroller unit of a vehicle.

Example 18 provides a video transmitter for transmitting data in an AC-coupled video system, the video transmitter including means for transmitting, over an AC-coupled analog transmission channel, video signal data, where each line of the video signal data is transmitted in a plurality of time slots allocated for transmitting the video signal data, and includes a plurality of baseband video components of an individual video line of a video frame of a video signal acquired by an image sensor; means for transmitting, over the AC-coupled analog transmission channel, downstream control data, where the downstream control data is transmitted in one or more time slots allocated for transmitting the downstream control data; and means for receiving, over the AC-coupled analog transmission channel, upstream control data, where the upstream control data is included in one or more time slots allocated for transmitting the upstream control data to the video transmitter.

Example 19 provides the video transmitter according to example 18, where the video transmitter is communicatively coupled to the image sensor, and is configured to assist modification of one or more operational settings of the image sensor device in accordance with the upstream control data received by the video transmitter.

Example 20 provides the video transmitter according to examples 18 or 19, further including means for transmitting, over the AC-coupled analog transmission channel, a constant voltage signal in one or more guardband time slots and/or in the one or more time slots allocated for transmitting the upstream control data to the video transmitter, where the one or more guardband time slots are immediately before and/or immediately after the one or more time slots allocated for transmitting the downstream control data, and/or the one or more guardband time slots are immediately before and/or immediately after the one or more time slots allocated for transmitting the upstream control data.

Example 21 provides an encoding method for encoding a digital output signal of an image sensor into any of the transmission sequences described above. This may advantageously allow for a more robust transmission of the video data.

Example 22 provides the encoding method according to example 21, further including a SAG effect reduction mechanism or step. This may advantageously enable preparation of the video data for transmission in a manner in which it can be recovered or at least substantially corrected upon reception.

Example 23 provides a decoding method for decoding an analog output encoded into one of the transmission sequences described above. This may advantageously allow for proper decoding of the transmitted video data.

Example 24 provides the decoding method according to example 23, further including a SAG effect reduction mechanism and/or method. This may advantageously improve the quality of the received signal for further processing and use.

Example 25 provides an encoding apparatus for encoding a digital output signal of an image sensor into any of the transmission sequences described above. This may advantageously allow for proper decoding of the transmitted video data.

Example 26 provides a decoding apparatus for decoding an analog output encoded into one of the transmission sequences described above. This may advantageously allow for proper decoding of the transmitted video data.

Example 27 provides a transmitter for encoding a digital output signal of an image sensor into any of the transmission sequences described above. This may advantageously allow for proper decoding of the transmitted video data.

Example 28 provides a receiver for decoding an analog output encoded into one of the transmission sequences described above. This may advantageously allow for proper decoding of the transmitted video data.

Example 29 provides a transmission channel/link that is terminated by a resistor or by an effective resistance at one or both ends. This may advantageously enhance the quality of transmission.

Any one of the system, the transmitter, the receiver, and the method of any one of the preceding examples may be implemented in a vehicle or in a surveillance system. Furthermore, any one of the system, the transmitter, the receiver, and the method of any one of the preceding examples may include, or be communicatively coupled/connected to an image sensor or camera configured to acquire the video signal (or, in general, a video/audio/image signal, which may include video and/or audio and/or image signals) to be transmitted over the AC-coupled link as described herein, where the camera may include a plurality of optical sensors (e.g. photodiodes) configured to generate pixel values of the video/audio/image signal to be transmitted over such an AC-coupled link.

Other Implementation Notes, Variations, and Applications

Principles and advantages discussed herein can be used in any device or system that may need an HD, AC-coupled signal and control link for communicating video signals, audio signals, and/or images, as well as bidirectional control data. It is to be understood that not necessarily all objects or advantages mentioned herein may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), FPGAs, and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be distributed or consolidated in any suitable manner. Along similar design alternatives, any of the illustrated components, modules, and elements of the FIGS. may be combined in various possible configurations, all of which are clearly within the broad scope of the present disclosure. In certain cases, it may be easier to describe one or more of the functionalities of a given set of flows by only referencing a limited number of electrical elements. It should be appreciated that the electrical circuits of the figures and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in the present disclosure references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to an HD, AC-coupled video/audio/image and control link, e.g. those summarized in the one or more processes shown in FIG. 5, illustrate only some of the possible functions that may be executed by, or within, the systems illustrated in the FIGS, e.g. the systems shown in FIGS. 9 and 10. Some of these operations may be deleted or removed where appropriate, or these operations may be modified or changed considerably without departing from the scope of the present disclosure. In addition, the timing of these operations may be altered considerably. The preceding operational flows, e.g. as shown in FIG. 5, have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the apparatus, device, or system described above may also be implemented with respect to the method or processes of using or operating said apparatus device, or system, and specifics in the examples provided for any of the apparatus, device, or system described herein may be used anywhere in corresponding methods or processes, and vice versa.

The invention claimed is:

1. A system for communicating video signals and control data over a wired analog transmission link, the system comprising:
 a transmitter, placed at a first location within a vehicle;
 a receiver, placed at a second location within the vehicle, where the second location is different from the first location;
 a scheduler, configured to allocate time slots for exchange of data between the transmitter and the receiver over the wired analog transmission link, by performing, for each of at least one or more video lines of a video frame of a video signal:
  allocating a plurality of time slots for transmitting, from the transmitter to the receiver, over the wired analog transmission link, a plurality of baseband video components of an individual video line,
  allocating one or more time slots for transmitting, from the transmitter to the receiver, over the wired analog transmission link, transmitter control data, and
  allocating one or more time slots for transmitting, from the receiver to the transmitter, over the wired analog transmission link, receiver control data.

2. The system according to claim 1, wherein the wired analog transmission link is a differential-pair transmission link.

3. The system according to claim 1, wherein the wired analog transmission link is a single-ended wire transmission link.

4. The system according to claim 1, wherein the wired analog transmission link is an AC-coupled analog transmission link between the transmitter and the receiver.

5. The system according to claim 4, wherein the transmitter control data includes metadata indicative of a statistical characteristic for two or more pixel values of the individual video line, and wherein the metadata is configured to enable the receiver to apply one or more DC offset correction techniques to the plurality of video components received from the transmitter.

6. The system according to claim 5, wherein the statistical characteristic is an average, a sum, or a median of the two or more pixel values.

7. The system according to claim 6, wherein the scheduler is further configured to allocate one or more time slots for transmitting, from the transmitter to the receiver, over the wired analog transmission link, a plurality of test pulses configured to enable the receiver to apply one or more signal amplitude gain (SAG) compensation techniques to the plurality of video components received from the transmitter.

8. The system according to claim 1, wherein:
 the one or more time slots for transmitting the transmitter control data include at least two time slots which are separated from one another by one or more time slots which are not for transmitting the transmitter control data, and/or
 the one or more time slots for transmitting the receiver control data include at least two time slots which are separated from one another by one or more time slots which are not for transmitting the receiver control data.

9. The system according to claim 1, wherein the scheduler is further configured to:
 allocate one or more guardband time slots immediately before and/or immediately after the one or more time slots for transmitting the transmitter control data, and/or
 allocate one or more guardband time slots immediately before and/or immediately after the one or more time slots for transmitting the receiver control data,
 wherein the transmitter is configured to transmit a constant voltage signal in the one or more guardband time slots and/or in the one or more time slots for transmitting the receiver control data.

10. The system according to claim 1, wherein:
 the plurality of components includes one of a first set of components and a second set of components,
 the first set of components includes a first color component and a second color component, and
 the second set of components includes a luminance component and a color component.

11. The system according to claim 1, wherein the plurality of time slots allocated for transmitting the plurality of components include a single time slot for each of the plurality of components.

12. The system according to claim 1, wherein a combined duration of the plurality of time slots for transmitting the plurality of components of the individual video line is equal to or shorter than a time in which the individual video line is provided to the transmitter.

13. The system according to claim 1, wherein the scheduler is configured to select a transmission rate for the exchange of data between the transmitter and the receiver.

14. A video receiver for an AC-coupled video system, the video receiver comprising:
 a receiver circuit, configured to receive data from a video transmitter over an AC-coupled analog transmission channel;
 an extraction circuit, configured to extract, from the received data, video signal data, where each line of the video signal data is extracted from a plurality of time slots, within the received data, allocated for transmitting a plurality of baseband video components of an individual video line of a video frame of a video signal; and
 a transmitter circuit, configured to transmit to the video transmitter, over the AC-coupled analog transmission channel, upstream control data, where the upstream control data is transmitted in one or more time slots allocated for transmitting the upstream control data.

15. The video receiver according to claim 14, wherein the video receiver is to be positioned in a first location within the vehicle, and the video transmitter is to be positioned in a second location within the vehicle, the second location being different from the first location.

16. The video receiver according to claim 14, wherein the extraction circuit is further configured to extract, from the received data, downstream control data, where the downstream control data is extracted from one or more time slots, within the received data, allocated for transmitting the downstream control data.

17. The video receiver according to claim 16, wherein:
during operation, the video receiver is to be communicatively coupled to a further device, and
the video receiver is configured to use one or more of the upstream control data and the downstream control data to perform one or more of:
assist the further device in modifying operational settings of the video transmitter or of one or more devices communicatively coupled to the video transmitter,
obtain status information of the video transmitter or of the one or more devices communicatively coupled to the video transmitter.

18. The video receiver according to claim 17, wherein the further device is a system controller or a microcontroller unit of a vehicle.

19. A video transmitter for an AC-coupled video system, the video transmitter comprising:
a transmitter circuit, configured to transmit to a video receiver, over an AC-coupled analog transmission channel, video signal data, where an individual line of the video signal data is transmitted in a plurality of time slots allocated for transmitting the video signal data, and includes a plurality of baseband video components of the individual video line of a video frame of a video signal;
and
a receiver circuit, configured to receive from the video receiver, over the AC-coupled analog transmission channel, upstream control data, wherein the upstream control data is included in one or more time slots allocated for transmitting the upstream control data to the video transmitter.

20. The video transmitter according to claim 19, wherein:
during operation, the video transmitter is to be communicatively coupled to an image sensor configured to acquire the video signal, and
the video transmitter is configured to assist modification of one or more operational settings of the image sensor in accordance with the upstream control data received by the video transmitter.

21. The video transmitter according to claim 19, wherein the transmitter circuit is further configured to transmit, over the AC-coupled analog transmission channel, downstream control data, where the downstream control data is transmitted in one or more time slots allocated for transmitting the downstream control data.

22. The video transmitter according to claim 21, wherein the transmitter circuit is further configured to transmit,
over the AC-coupled analog transmission channel, a constant voltage signal in at least one of:
one or more guardband time slots, and
the one or more time slots allocated for transmitting the upstream control data to the video transmitter.

23. The video transmitter according to claim 22, wherein at least one of the one or more guardband time slots is immediately before or immediately after the one or more time slots allocated for transmitting the downstream control data.

24. The video transmitter according to claim 22, wherein at least one of the one or more guardband time slots is immediately before or immediately after the one or more time slots allocated for transmitting the upstream control data.

* * * * *